US011619502B2

(12) United States Patent
Voznesensky

(10) Patent No.: US 11,619,502 B2
(45) Date of Patent: Apr. 4, 2023

(54) MONITORING AUTONOMOUS VEHICLE ROUTE CONFORMANCE FOR IMPROVED EFFICIENCY

(71) Applicant: Uber Technologies, Inc., San Francisco, CA (US)

(72) Inventor: Michael Voznesensky, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 252 days.

(21) Appl. No.: 16/827,170

(22) Filed: Mar. 23, 2020

(65) Prior Publication Data
US 2020/0309543 A1 Oct. 1, 2020

Related U.S. Application Data

(60) Provisional application No. 62/823,586, filed on Mar. 25, 2019.

(51) Int. Cl.
G01C 21/34 (2006.01)
G05D 1/02 (2020.01)
G01C 21/36 (2006.01)
G06Q 10/06 (2012.01)
G06Q 10/0631 (2023.01)

(52) U.S. Cl.
CPC ....... G01C 21/343 (2013.01); G01C 21/3484 (2013.01); G01C 21/3697 (2013.01); G05D 1/0274 (2013.01); G06Q 10/06311 (2013.01); G06Q 2240/00 (2013.01)

(58) Field of Classification Search
CPC .............. G01C 21/343; G01C 21/3484; G01C 21/3697; G05D 1/0274; G06Q 10/06311; G06Q 2240/00
See application file for complete search history.

(56) References Cited

U.S. PATENT DOCUMENTS

| 10,579,070 | B1 * | 3/2020 | Konrardy | G08B 21/18 |
| 2004/0210359 | A1 * | 10/2004 | Herz | G05D 1/0274 |
| | | | | 701/25 |
| 2010/0161392 | A1 * | 6/2010 | Ashby | G06Q 50/30 |
| | | | | 705/13 |
| 2017/0101056 | A1 * | 4/2017 | Park | G08G 1/04 |
| 2018/0259356 | A1 * | 9/2018 | Rolf | G01C 21/3682 |

* cited by examiner

Primary Examiner — Rami Khatib
Assistant Examiner — Shahira Baajour
(74) Attorney, Agent, or Firm — Schwegman Lundberg & Woessner, P.A.

(57) ABSTRACT

Autonomous vehicles are requested to execute a route from an origin location to a destination location. The route specifies one or more waypoints between the origin location and the destination location, with the autonomous vehicle requested to transit from the origin location to the destination location via the waypoints. Some autonomous vehicles vary their route and do not necessarily visit each of the specified waypoints along the route. To improve adherence to the waypoints specified in the route, an arranger assigns a weight to each of the waypoints. The weight is used to score the vehicle's performance of the route based at least in part on whether the vehicle visited each of the waypoints and the weight associated with each of the waypoints. The score is used to control dispatch of additional service requests to the autonomous vehicle or other autonomous vehicles operated by the same operator or manufacturer.

17 Claims, 20 Drawing Sheets

MONITORING AUTONOMOUS VEHICLE ROUTE CONFORMANCE FOR IMPROVED EFFICIENCY

CROSS REFERENCE TO RELATED APPLICATIONS

This application claims priority to U.S. Provisional Application No. 62/823,586, filed Mar. 25, 2019 and entitled "MONITORING AUTONOMOUS VEHICLE ROUTE CONFORMANCE FOR IMPROVED EFFICIENCY." The contents of this prior application are considered part of this application, and are hereby incorporated by reference in their entirety.

FIELD

This document pertains generally, but not by way of limitation, to devices, systems, and methods for operating and/or managing an autonomous vehicle according to a route.

BACKGROUND

An arrangement system provides for automated generation of vehicle routes to accomplish transportation services from origin locations to destination locations. Each of the arrangement system's defined routes may define a path a vehicle should follow to get from an origin location of the route to a destination location for the route. As a vehicle executes the arranger defined route, it may or may not follow the path from the origin location to the destination location. For example, in some cases, the vehicle takes an alternate route from that specified by the arranger. Thus, methods for reconciling differences between an arranger defined route and a route actually taken by a vehicle are needed.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DETAILED DESCRIPTION

Figure 1:
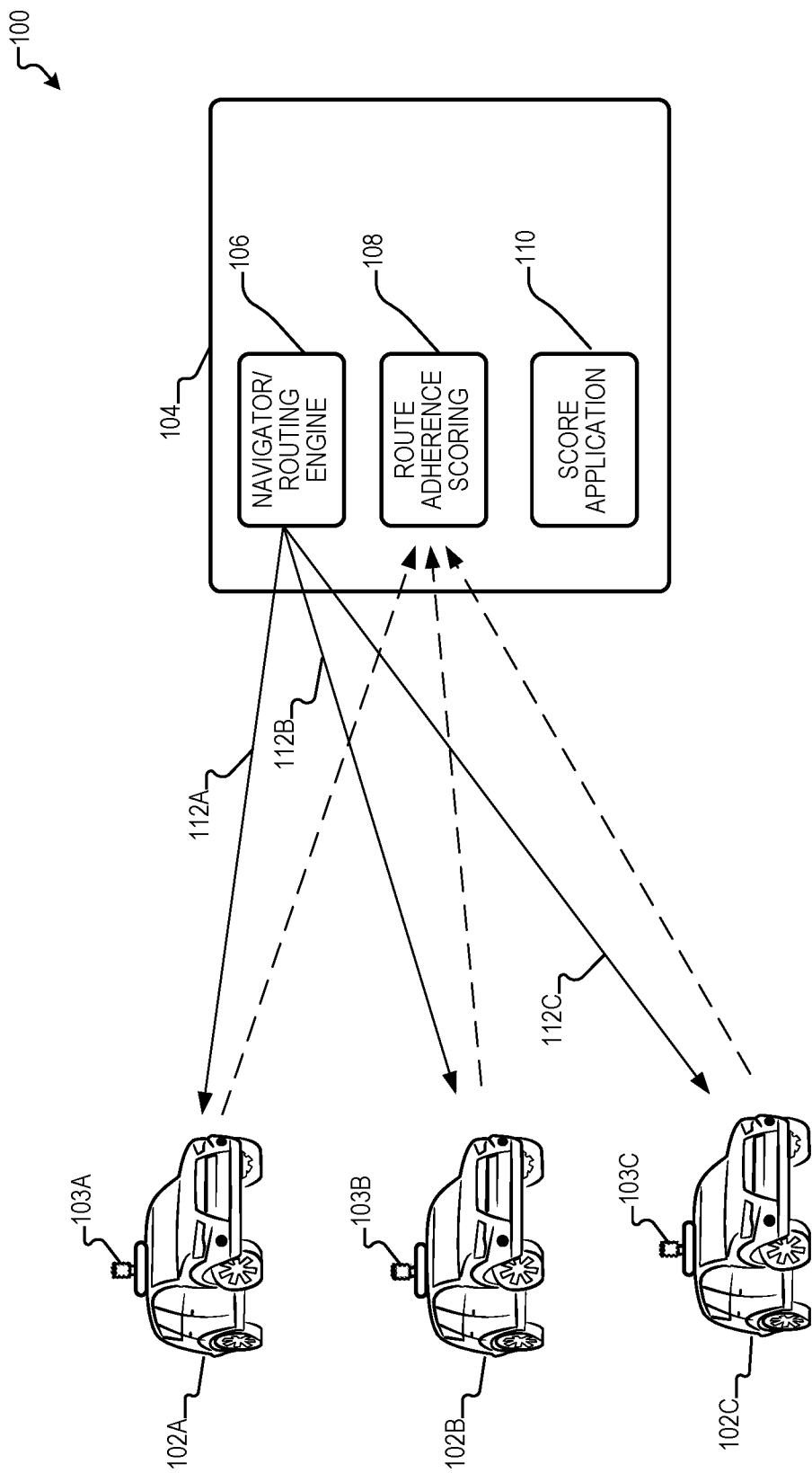
FIG. 1 is an overview diagram showing components of a system that may be implemented in one or more of the disclosed embodiments.

Examples described herein are directed to systems and methods for routing autonomous vehicles. As autonomous vehicles continue to develop and mature, the pool of available autonomous vehicles will include vehicles having a mix of technical capabilities. Some autonomous control systems may perform better under first conditions and/or first geographies, while other autonomous control systems may perform better under second particular conditions or second geographies. By assigning vehicles to routes where those vehicles perform best, overall efficiency and performance of an autonomous vehicle network is improved.

A technical problem is presented in that how different types of autonomous vehicles perform in different environments is not necessarily well understood. For example, autonomous vehicle vendors may overstate or sometimes understate capabilities of their autonomous vehicles. Further, as autonomous vehicle software is updated, skills and capabilities of autonomous vehicles will be changing. These changes may typically include advancements in capabilities may also sometimes represent undocumented or at least initially unknown reductions in capabilities, when, for example, new software updates are provided or installed.

The disclosed embodiments solve this technical problem by assessing autonomous vehicle capabilities. These assessments are based on analytics collected on how those vehicles perform on assigned routes. In an autonomous or semi-autonomous vehicle (collectively referred to as an autonomous vehicle (AV)), a vehicle autonomy system, sometimes referred to as an AV stack, controls one or more vehicle controls, such as braking, steering, or throttle. In a fully autonomous vehicle, the vehicle autonomy system assumes full control of the vehicle. In a semi-autonomous vehicle, the vehicle autonomy system assumes a portion of the vehicle control, with a human user (e.g., a vehicle operator) still providing some control input. Some autonomous vehicles can also operate in a manual mode, in which a human user provides all control inputs to the vehicle.

An autonomous vehicle executes a trip by traversing from a trip start point to a trip endpoint. For some trips, the vehicle picks up a passenger or cargo at the trip start point and drops off the passenger or cargo at the trip endpoint. A navigator/routing engine generates routes for an autonomous vehicle. A route is a path that an autonomous vehicle takes, or plans to take, over one or more roadways to execute a trip. For example, a route can extend from a trip start point to a trip endpoint. Some trips also include one or more waypoints. The autonomous vehicle can be routed to the waypoints between the trip start point and the trip endpoint.

In some examples, a route includes a series of connected route components, sometimes also referred to as lane segments. Each route component corresponds to a portion of a roadway that can be traversed by the autonomous vehicle. In some examples, route components are described by a routing graph that indicates connectivity between route components and a cost for the vehicle to traverse different route components and/or to traverse between route components. The navigator/routing engine can generate a route, for example, by finding the lowest cost combination of route components between the trip start point and the trip endpoint.

In some embodiments, the route is be defined via a series of waypoints, that indicate particular geographic locations that are to be traversed to complete the transportation service. Separate methods provide for navigating a vehicle from a route's origin to the route's destination, based on the route provided by the arrangement system. Depending on various factors, the separate methods determine a second set of waypoints that are traversed to navigate a vehicle from the route's origin to the route's destination. The second set of waypoints vary from the set of waypoints initially defined by the dispatch system. Thus, methods of reconciling the differing route waypoint determinations are needed.

While the autonomous vehicle is executing the route defined by the navigator/routing engine, a location of the autonomous vehicle is monitored to determine whether the autonomous vehicle visits or traverses the waypoints defined by the navigator/routing engine. When the route is completed, the autonomous vehicle is scored based on which of the waypoints were visited during performance of the route and the weights associated with each of the waypoints. The score is used to determine a variety of effects applied to the autonomous vehicle. For example, in some aspects, the score is used to control a service arranger with respect to additional service requests assigned to the autonomous vehicle. Particular routes that resulted in a relatively higher score are reassigned to the autonomous vehicle while routes resulting in a relatively lower score are reassigned to the autonomous vehicle less frequently than routes getting the higher score. In some cases, compensation (e.g., financial payment, priority treatment, etc.) made to an operator of an autonomous vehicle may vary based on the score. In some cases, the score is used to determine a feedback score that is presented to potential riders before accepting a ride on a particular autonomous vehicle or autonomous vehicle type. These and other embodiments are discussed in more detail below.

FIG. 1 is an overview diagram showing components of a system that is implemented in one or more of the disclosed embodiments. The overview diagram shows three example autonomous vehicles 102A-C.

The autonomous vehicle 102 can be a passenger vehicle, such as a truck, car, bus or other similar vehicle. The autonomous vehicle 102 can also be a delivery vehicle, such as a van, a truck, a tractor-trailer, etc. The autonomous vehicle 102 is a self-driving vehicle (SDVs) or autonomous vehicle (AVs). For example, the autonomous vehicle 102 includes a vehicle autonomy system, described in more detail with respect to FIG. 2, that is configured to operate some or all the controls of the autonomous vehicle 102 (e.g., acceleration, braking, steering).

The autonomous vehicles 102A-C have one or more remote-detection sensors 103A-C respectively that receive return signals from the environment 100. Return signals are reflected from objects in the environment 100, such as the ground, buildings, trees, etc. The remote-detection sensors 103A-C may include one or more active sensors, such as LIDAR, RADAR, and/or SONAR that emit sound or electromagnetic radiation in the form of light or radio waves to generate return signals. The remote-detection sensors 103A-C can also include one or more passive sensors, such as cameras or other imaging sensors, proximity sensors, etc., that receive return signals that originated from other origins of sound or electromagnetic radiation. Information about the environment 100 is extracted from the return signals. In some examples, the remote-detection sensors 103A-C include one or more passive sensors that receive reflected ambient light or other radiation, such as a set of monoscopic or stereoscopic cameras. Remote-detection sensors 103A-C provide remote sensor data that describes the environment 100. Each of the autonomous vehicles 102A-C can also include other types of sensors, for example, as described in more detail with respect to FIG. 3.

The autonomous vehicles 102A-C are in communication with an arranger 104. The arranger 104 includes a navigator/routing engine 106, a route adherence scoring component 108, and a score application component 110.

The arranger 104 can be configured to generate routes for multiple autonomous vehicles of different types including, for example, autonomous vehicles 102A-C In some examples, the arranger 104 implements a transportation service in which the autonomous vehicles 102A-C are routed to pick up and drop off passengers, cargo, or other material.

The arranger 104 can include one or more servers or other suitable computing devices that execute the navigator/routing engine 106. The navigator/routing engine 106 is programmed to generate routes for the various autonomous vehicles 102A-C, utilizing a routing graph and constraint data, as described herein. In some examples, routes generated by the navigator/routing engine 106 are provided to one or more of the vehicles 102A-C. For example, the arranger 104 can provide a route to any of the autonomous vehicles 102A-C with a request that the vehicle 102A-C begin traveling the route.

In some examples, the arranger 104 generates routes for the autonomous vehicles 102A-C and uses the generated routes to determine whether to offer a service request to a particular autonomous vehicle 102A, 102B, or 102C. For example, the arranger 104 can receive a request for a service between a vehicle start point and a vehicle end point. The arranger 104 can use the navigator/routing engine 106 to generate routes for executing the service for multiple autonomous vehicles 102A-C. The arranger 104 can offer the service request to the vehicle 102A, 102B, or 102C having the most favorable (e.g., lowest cost) route for executing the service. If the vehicle accepts the service request, the arranger 104 may provide the generated route to the vehicle or the vehicle can generate its own route for executing the service request.

The navigator/routing engine 106 communicates route information 112A-C to the autonomous vehicles 102A-C respectively. The route information 112A-C defines a route assigned to each of the respective autonomous vehicles 102A-C. The route defines a path to traverse a map from an origin location of the route to a destination location of the route. The route information 112A-C includes waypoint information, which defines geographic locations that the respective autonomous vehicle should traverse when executing the respective route.

The autonomous vehicles 102A-C communicate position information to the route adherence scoring component 108. For example, in some aspects, the autonomous vehicles 102A-C may communicate position information periodically to the route adherence scoring component 108. For example, position information is communicated at 1, 5, 10, 30, or 60-minute intervals in some aspects. In alternative aspects, position information is stored locally on the autonomous vehicle and uploaded at an appropriate time. Based on the position information provided by the autonomous vehicles 102A-C, the route adherence scoring component 108 determines how well each of the autonomous vehicles 102A-C conformed to the routes indicated by the route information 112A-C. Based on a level of conformance determined by the route adherence scoring component 108, each autonomous vehicle 102A-C's performance is scored by the route adherence scoring component 108. The score may then be applied to the autonomous vehicle operations by the score application component 110. For example, in some aspects the score is applied so as to modify an arrangement algorithm that determines which routes to provide to which autonomous vehicles 102A-C, or to which autonomous vehicle types, for example, a type of autonomous vehicle is defined, in some embodiments, by a manufacturer or operator that provided the respective vehicle.

Figure 2:
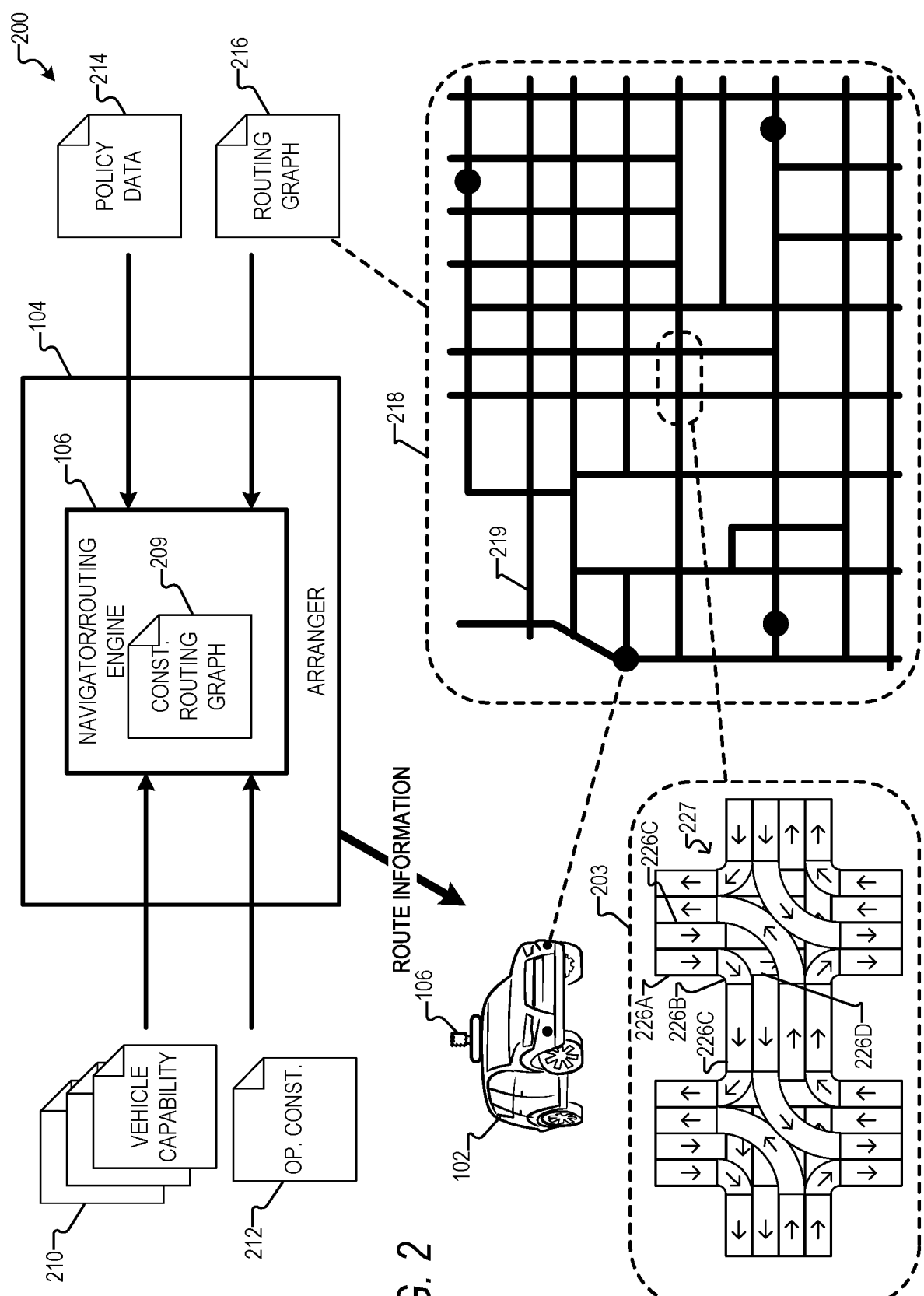
FIG. 2 is an expanded view of the navigator/routing engine.

FIG. 2 is an expanded view 200 of the navigator/routing engine 106. The navigator/routing engine 106 can generate routes utilizing, for example, a routing graph 216 in conjunction with constraint data such as, for example, policy data 214, vehicle capability data 210, and/or operational constraint data 212. The navigator/routing engine 106 accesses the routing graph 216 and/or constraint data in any suitable manner. In some examples, the routing graph 216 and/or constraint data is stored at a data storage device associated with the navigator/routing engine 106. Also, in some examples, the routing graph 216 and/or constraint data can be received from another origin or system. For example, vehicle capability data 210 can be, or be derived from, operational domain (OD) data provided by the manufacturer of the vehicle or of its vehicle autonomy system.

FIG. 2 shows a graphical representation 218 including a portion of the routing graph 216. The representation 218 shows various interconnected roadways 219. The roadways are made up of route components. The routing graph 216 can also include directionality data indicating the direction of the various route components and connectivity data indicating possible transitions between the route components.

Example route components are shown in a break-out window 203 to illustrate additional details of the example routing graph 216. Route components in the break-out window 203 are illustrated as shapes with arrows indicating the directionality of the route components. Route components can be connected to one another according to their directionality. For example, a vehicle can approach the intersection 227 by traversing example route component 226A. From the route component 226A, the vehicle can transition to example route component 226D to proceed straight through the intersection 227. The vehicle can also transition to the route component 226B to turn right at the intersection 227. In some examples, the vehicle can also change lanes by transitioning from the route component 226A to route component 226C.

The navigator/routing engine 106 is configured to utilize the constraint data, such as policy data 214, operational constraint data 212, and/or vehicle capability data 210, to generate constrained routing graph 209 data. The constrained routing graph 209 data is used to generate a route. Generally, constraint data for a particular constraint includes a constraint property or set of constraint properties of route components subject to the constraint and one or more routing graph modifications for implementing the constraint. Routing graph modifications can include, for example, removing route components having the indicated property or properties from the routing graph, removing connections to route components having the indicated property or properties from the routing graph, and/or changing a cost of route components having the indicated property or properties. Another example routing graph modification can include changing a cost associated with route component and/or transitions to the route component.

In some embodiments, costs are adjusted based on properties of a route. For example, if constraint data indicates that route components having a particular property or set of properties are disfavored, the costs to traverse and/or transition to the route components are increased. On the other hand, if constraint data indicates that route components having a particular property or set of properties are favored, the costs to traverse and/or transition to the route components are decreased in these embodiments.

Routing graph modifications can relate to route components that have the indicated constraint property or properties. For example, if a policy constraint forbids routing a vehicle through route components that include or are in a school zone, a corresponding routing graph modification includes removing such school zone route components from the routing graph 216 and/or removing transitions to such school zone route components. Routing graph modifications can, in some examples, describe changes to route components other than those having the identified properties. Consider an example constraint that is to avoid cul-de-sacs. The associated routing graph modification could involve removing route components that include cul-de-sacs and also removing route components that do not include cul-de-sacs but can lead only to other route components that include cul-de-sacs.

Policy data 214 can describe policy constraints including, for example, route component properties that identify route components subject to a policy constraint and corresponding routing graph modifications. Policy constraints refer to types of route segments that it is desirable for a vehicle to avoid or prioritize. An example policy constraint is to avoid route components that are in or pass through school zones. Another example policy constraint is to avoid routing vehicles in residential neighborhoods. Yet another example policy constraint is to favor routing vehicles on controlled-access highways, if available. Policy constraints can apply to some vehicles, some vehicle types, all vehicles, or all vehicle types.

Vehicle capability data 210 describes capability constraints associated with various vehicles of different types. For example, the navigator/routing engine 106 can be programmed to generate routes for autonomous vehicles 102A-C having different types of vehicle autonomy systems, different types of sensors, different software versions, or other variations. Vehicles of different types can have different capabilities. For example, a vehicle of one type is capable of making all legal unprotected lefts. A vehicle of another type is incapable of making unprotected lefts, or capable of making unprotected lefts only if oncoming traffic is traveling less than a threshold speed. In another example, one type of vehicle is capable of traveling on controlled-access highways while another type of vehicle is capable of traveling only on roadways with a speed limit that is less than 45 miles per hour.

The vehicle capability data 210 includes constraint data identifying a route segment property or properties (e.g., includes an unprotected left, is part of a controlled access highway, etc.) and routing graph modification data indicating what is to be done to route components having the indicated property or properties. For example, route components that a particular vehicle type is not capable of traversing can be removed from the routing graph modification data or can have connectivity data modified to remove transitions to those route components. If the route component properties indicate a maneuver that is undesirable for a vehicle, but not forbidden, then the routing graph modification data can call for increasing the cost of an identified route component or transitions thereto.

Operational constraint data 212 describes operational constraints, for example, with sets of route component properties and associated routing graph modifications. Operational constraints can be based, for example, on the state of one or more roadways. For example, if a roadway is to be closed for a parade or for construction, an operational constraint can identify properties (e.g., names or locations) of route segments that are part of the closure and an associated routing graph modification (e.g., removing the route components, removing transitions to the route components, etc.).

As described, the navigator/routing engine 106 applies constraint data such as policy data 214, operational constraint data 212, and vehicle capability data 210 to the routing graph 216 to generate a constrained routing graph 209. The constrained routing graph 209 is used to generate a route for an autonomous vehicle 102A, 102B, and/or 102C. The navigator/routing engine 106, in some examples, generates the constrained routing graph 209 at different times during route generation. In some examples, the navigator/routing engine 106 receives a request to generate a route for a particular autonomous vehicle 102A, 102B, and/or 102C. The navigator/routing engine 106 responds by accessing the current constraint data for the autonomous vehicle 102A, 102B, and/or 102C. The navigator/routing engine 106 applies the constraint data to the routing graph 216 to generate the constrained routing graph 209 and then uses the constrained routing graph 209 to generate a route.

In another example, the navigator/routing engine 106 generates the constrained routing graph 209 on an as-needed basis. For example, various path planning algorithms described herein operate using graph expansion. To apply a graph expansion-type algorithm, the navigator/routing engine 106 begins at an algorithm start point and expands along allowable transitions to string together connected route components. The algorithm is complete when one or more of the strings of connected route components has an allowable transition to or from an algorithm end point. Many graph expansion algorithms can be applied forwards (e.g., from a vehicle start point to a vehicle end point) or backwards (e.g., from a vehicle end point to a vehicle start point).

To generate a constrained routing graph 209 on an as-needed basis, the navigator/routing engine 106 can request a subset of the constrained routing graph 209 while route expansion is being performed. For example, the navigator/routing engine 106 can determine a first portion of a route including a string of connected route components. The navigator/routing engine 106 can then request constrained routing graph 209 data describing a set of route components that can be transitioned to the last route component of the string (or a set of route components from which a vehicle can transition to the last route component of the string if the algorithm is applied backwards). In this way, the navigator/routing engine 106 may not need to apply the constraint data to all route components of the routing graph 216 but, instead, only to the route components used by the path planning algorithm.

Figure 3:
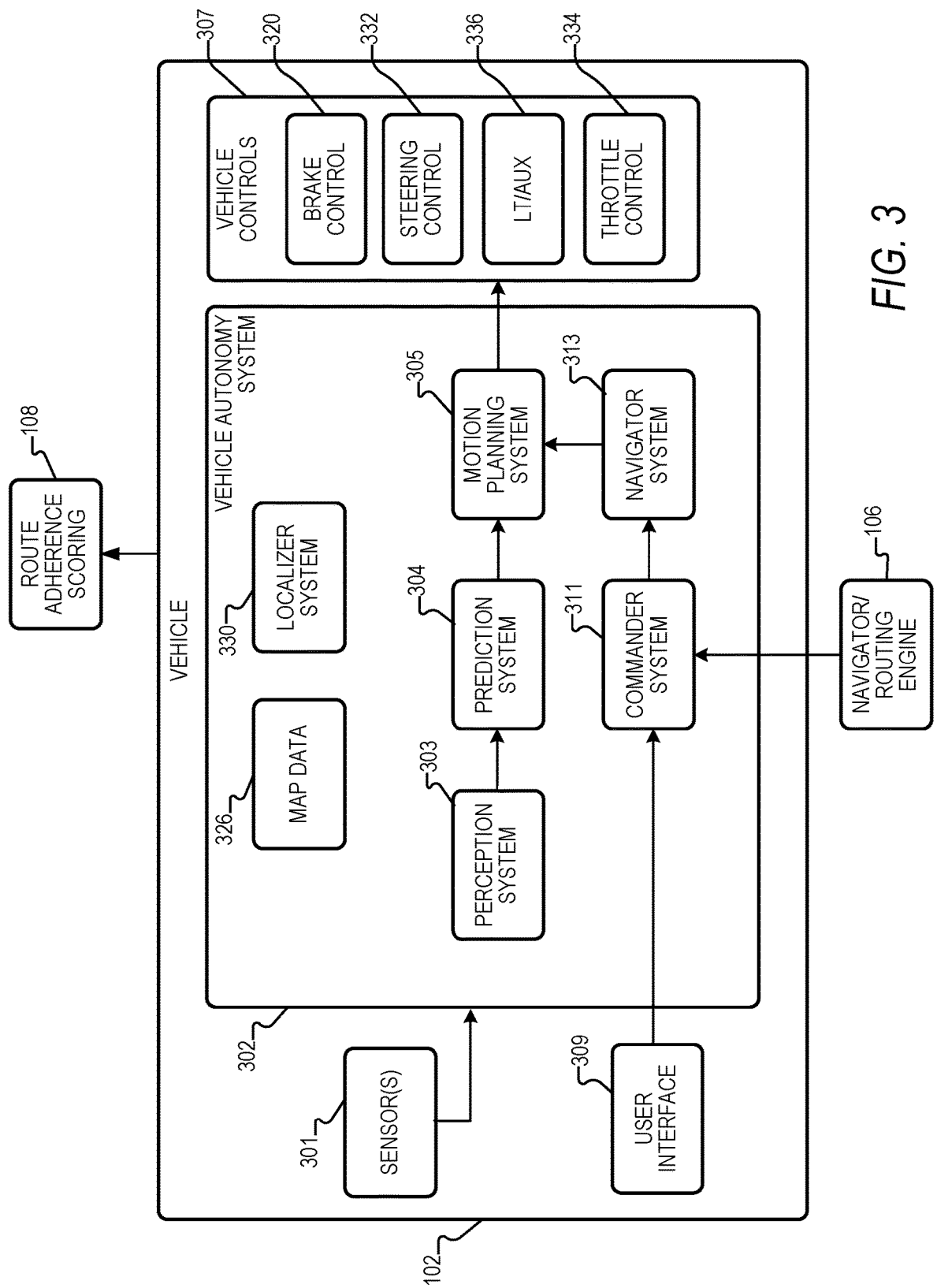
FIG. 3 depicts a block diagram of an example vehicle according to example aspects of the present disclosure.

FIG. 3 depicts a block diagram of an example autonomous vehicle 102 according to example aspects of the present disclosure. The autonomous vehicle 102 includes one or more sensors 301, a vehicle autonomy system 302, and one or more vehicle controls 307. The autonomous vehicle 102 is an autonomous vehicle, as described herein. The example autonomous vehicle 102 shows just one example arrangement of an autonomous vehicle. In some examples, autonomous vehicles of different types can have different arrangements.

The vehicle autonomy system 302 includes a commander system 311, a navigator system 313, a perception system 303, a prediction system 304, a motion planning system 305, map data 326 and a localizer system 330 that cooperate to perceive the surrounding environment of the autonomous vehicle 102 and determine a motion plan for controlling the motion of the autonomous vehicle 102 accordingly.

The vehicle autonomy system 302 is engaged to control the autonomous vehicle 102 or to assist in controlling the autonomous vehicle 102. In particular, the vehicle autonomy system 302 receives sensor data from the one or more sensors 301, attempts to comprehend the environment surrounding the autonomous vehicle 102 by performing various processing techniques on data collected by the sensors 301, and generates an appropriate route through the environment. The vehicle autonomy system 302 sends commands to control the one or more vehicle controls 307 to operate the autonomous vehicle 102 according to the route.

Various portions of the vehicle autonomy system 302 receive sensor data from the one or more sensors 301. For example, the sensors 301 may include remote-detection sensors as well as motion sensors such as an inertial measurement unit (IMU), one or more encoders, or one or more odometers. The sensor data includes information that describes the location of objects within the surrounding environment of the autonomous vehicle 102, information that describes the motion of the autonomous vehicle 102, etc.

The sensors 301 may also include one or more remote-detection sensors or sensor systems, such as a LIDAR, a RADAR, one or more cameras, etc. As one example, a LIDAR system of the one or more sensors 301 generates sensor data (e.g., remote-detection sensor data) that includes the location (e.g., in three-dimensional space relative to the LIDAR system) of a number of points that correspond to objects that have reflected a ranging laser. For example, the LIDAR system measures distances by measuring the Time of Flight (TOF) that it takes a short laser pulse to travel from the sensor to an object and back, calculating the distance from the known speed of light.

As another example, a RADAR system of the one or more sensors 301 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system reflect off an object and return to a receiver of the RADAR system, giving information about the object's location and speed. Thus, a RADAR system provides useful information about the current speed of an object.

As yet another example, one or more cameras of the one or more sensors 301 may generate sensor data (e.g., remote sensor data) including still or moving images. Various processing techniques (e.g., range imaging techniques such as structure from motion, structured light, stereo triangulation, and/or other techniques) can be performed to identify the location (e.g., in three-dimensional space relative to the one or more cameras) of a number of points that correspond to objects that are depicted in an image or images captured by the one or more cameras. Other sensor systems can identify the location of points that correspond to objects as well.

As another example, the one or more sensors 301 can include a positioning system. The positioning system determines a current position of the autonomous vehicle 102. The positioning system can be any device or circuitry for analyzing the position of the autonomous vehicle 102. For example, the positioning system can determine a position by using one or more of inertial sensors, a satellite positioning system such as a Global Positioning System (GPS), based on IP address, by using triangulation and/or proximity to network access points or other network components (e.g., cellular towers, WiFi access points) and/or other suitable techniques. The position of the autonomous vehicle 102 can be used by various systems of the vehicle autonomy system 302.

Thus, the one or more sensors 301 are used to collect sensor data that includes information that describes the location (e.g., in three-dimensional space relative to the autonomous vehicle 102) of points that correspond to objects within the surrounding environment of the autonomous vehicle 102. In some implementations, the sensors 301 can be positioned at various different locations on the autonomous vehicle 102. As an example, in some implementations, one or more cameras and/or LIDAR sensors can be located in a pod or other structure that is mounted on a roof of the autonomous vehicle 102 while one or more RADAR sensors can be located in or behind the front and/or rear bumper(s) or body panel(s) of the autonomous vehicle 102. As another example, camera(s) can be located at the front or rear bumper(s) of the autonomous vehicle 102. Other locations can be used as well.

The localizer system 330 receives some or all of the sensor data from sensors 301 and generates vehicle poses for the autonomous vehicle 102. A vehicle pose describes a position and attitude of the autonomous vehicle 102. The vehicle pose (or portions thereof) can be used by various other components of the vehicle autonomy system 302 including, for example, the perception system 303, the prediction system 304, the motion planning system 305 and the navigator system 313. The vehicle (e.g., the localizer system 330, sensors 301, etc.) may also provide position information to the route adherence scoring component 108, as discussed above with respect to FIG. 1.

The position of the autonomous vehicle 102 is a point in a three-dimensional space. In some examples, the position is described by values for a set of Cartesian coordinates, although any other suitable coordinate system may be used in other embodiments. The attitude of the autonomous vehicle 102 generally describes the way in which the autonomous vehicle 102 is oriented at its position. In some examples, attitude is described by a yaw about the vertical axis, a pitch about a first horizontal axis, and a roll about a second horizontal axis. In some examples, the localizer system 330 generates vehicle poses periodically (e.g., every second, every half second). The localizer system 330 appends time stamps to vehicle poses, where the time stamp for a pose indicates the point in time that is described by the pose. The localizer system 330 generates vehicle poses by comparing sensor data (e.g., remote sensor data) to map data 326 describing the surrounding environment of the autonomous vehicle 102.

In some examples, the localizer system 330 includes one or more pose estimators and a pose filter. Pose estimators generate pose estimates by comparing remote-sensor data (e.g., LIDAR, RADAR) to map data. The pose filter receives pose estimates from the one or more pose estimators as well as other sensor data such as, for example, motion sensor data from an IMU, encoder, or odometer. In some examples, the pose filter executes a Kalman filter or machine learning algorithm to combine pose estimates from the one or more pose estimators with motion sensor data to generate vehicle poses. In some examples, pose estimators generate pose estimates at a frequency less than the frequency at which the localizer system 330 generates vehicle poses. Accordingly, the pose filter generates some vehicle poses by extrapolating from a previous pose estimate utilizing motion sensor data.

Vehicle poses and/or vehicle positions generated by the localizer system 330 are provided to various other components of the vehicle autonomy system 302. For example, the commander system 311 may utilize a vehicle position to determine whether to respond to a call from the navigator/routing engine 106.

The commander system 311 determines a set of one or more target locations that are used for routing the autonomous vehicle 102. The target locations are determined based on user input received via a user interface 309 of the autonomous vehicle 102. The user interface 309 may include and/or use any suitable input/output device or devices. In some examples, the commander system 311 determines the one or more target locations considering data received from the navigator/routing engine 106. The navigator/routing engine 106 is programmed to provide instructions to multiple vehicles, for example, as part of a fleet of vehicles for moving passengers and/or cargo. Data from the navigator/routing engine 106 can be provided via a wireless network, for example.

The navigator system 313 receives one or more target locations from the commander system 311 and map data 326. Map data 326, for example, provides detailed information about the surrounding environment of the autonomous vehicle 102. Map data 326 provides information regarding identity and location of different roadways and segments of roadways (e.g., lane segments or route components). A roadway is a place where the autonomous vehicle 102 can drive and may include, for example, a road, a street, a highway, a lane, a parking lot, or a driveway. Routing graph data is a type of map data 326.

From the one or more target locations and the map data 326, the navigator system 313 generates route data describing a route for the vehicle to take to arrive at the one or more target locations. In some implementations, the navigator system 313 determines route data using one or more path planning algorithms based on costs for route components, as described herein. For example, a cost for a route can indicate a time of travel, risk of danger, or other or other factor associated with adhering to a particular candidate route. For example, the reward can be of a sign opposite to that of cost.

Route data describing a route is provided to the motion planning system 305, which commands the vehicle controls 307 to implement the route or route extension, as described herein. The navigator system 313 can generate routes as described herein using a general-purpose routing graph and constraint data. Also, in examples where route data is received from the navigator/routing engine 106, that route data can also be provided to the motion planning system 305.

The perception system 303 detects objects in the surrounding environment of the autonomous vehicle 102 based on sensor data, map data 326, and/or vehicle poses provided by the localizer system 330. For example, map data 326 used by the perception system describes roadways and segments thereof and may also describe: buildings or other items or objects (e.g., lampposts, crosswalks, curbing); location and directions of traffic lanes or lane segments (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle autonomy system 302 in comprehending and perceiving its surrounding environment and its relationship thereto.

In some examples, the perception system 303 determines state data for one or more of the objects in the surrounding environment of the autonomous vehicle 102. State data describes a current state of an object (also referred to as features of the object). The state data for each object describes, for example, an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the autonomous vehicle 102; minimum path to interaction with the autonomous vehicle 102; minimum time duration to interaction with the autonomous vehicle 102; and/or other state information.

In some implementations, the perception system 303 determines state data for each object over a number of iterations. In particular, the perception system 303 updates the state data for each object at each iteration. Thus, the perception system 303 detects and tracks objects, such as other vehicles, that are proximate to the autonomous vehicle 102 over time.

The prediction system 304 is configured to predict one or more future positions for an object or objects in the environment surrounding the autonomous vehicle 102 (e.g., an object or objects detected by the perception system 303). The prediction system 304 generates prediction data associated with one or more of the objects detected by the perception system 303. In some examples, the prediction system 304 generates prediction data describing each of the respective objects detected by the prediction system 304.

Prediction data for an object is indicative of one or more predicted future locations of the object. For example, the prediction system 304 may predict where the object will be located within the next 5 seconds, 10 seconds, 100 seconds, etc. Prediction data for an object may indicate a predicted trajectory (e.g., predicted path) for the object within the surrounding environment of the autonomous vehicle 102. For example, the predicted trajectory (e.g., path) can indicate a path along which the respective object is predicted to travel over time (and/or the speed at which the object is predicted to travel along the predicted path). The prediction system 304 generates prediction data for an object, for example, based on state data generated by the perception system 303. In some examples, the prediction system 304 also considers one or more vehicle poses generated by the localizer system 330 and/or map data 326.

In some examples, the prediction system 304 uses state data indicative of an object type or classification to predict a trajectory for the object. As an example, the prediction system 304 can use state data provided by the perception system 303 to determine that a particular object (e.g., an object classified as a vehicle) approaching an intersection and maneuvering into a left-turn lane intends to turn left. In such a situation, the prediction system 304 predicts a trajectory (e.g., path) corresponding to a left turn for the autonomous vehicle 102 such that the autonomous vehicle 102 turns left at the intersection. Similarly, the prediction system 304 determines predicted trajectories for other objects, such as bicycles, pedestrians, parked vehicles, etc. The prediction system 304 provides the predicted trajectories associated with the object(s) to the motion planning system 305.

In some implementations, the prediction system 304 is a goal-oriented prediction system 304 that generates one or more potential goals, selects one or more of the most likely potential goals, and develops one or more trajectories by which the object can achieve the one or more selected goals. For example, the prediction system 304 can include a scenario generation system that generates and/or scores the one or more goals for an object, and a scenario development system that determines the one or more trajectories by which the object can achieve the goals. In some implementations, the prediction system 304 can include a machine-learned goal-scoring model, a machine-learned trajectory development model, and/or other machine-learned models.

The motion planning system 305 commands the vehicle controls based at least in part on the predicted trajectories associated with the objects within the surrounding environment of the autonomous vehicle 102, the state data for the objects provided by the perception system 303, vehicle poses provided by the localizer system 330, map data 326, and route or route extension data provided by the navigator system 313. Stated differently, given information about the current locations of objects and/or predicted trajectories of objects within the surrounding environment of the autonomous vehicle 102, the motion planning system 305 determines control commands for the autonomous vehicle 102 that best navigate the autonomous vehicle 102 along the route or route extension relative to the objects at such locations and their predicted trajectories on acceptable roadways.

In some implementations, the motion planning system 305 can also evaluate one or more cost functions and/or one or more reward functions for each of one or more candidate control commands or sets of control commands for the autonomous vehicle 102. Thus, given information about the current locations and/or predicted future locations/trajectories of objects, the motion planning system 305 can determine a total cost (e.g., a sum of the cost(s) and/or reward(s) provided by the cost function(s) and/or reward function(s)) of adhering to a particular candidate control command or set of control commands. The motion planning system 305 can select or determine a control command or set of control commands for the autonomous vehicle 102 based at least in part on the cost function(s) and the reward function(s). For example, the motion plan that minimizes the total cost can be selected or otherwise determined.

In some implementations, the motion planning system 305 can be configured to iteratively update the route or route extension for the autonomous vehicle 102 as new sensor data is obtained from one or more sensors 301. For example, as new sensor data is obtained from one or more sensors 301, the sensor data can be analyzed by the perception system 303, the prediction system 304, and the motion planning system 305 to determine the motion plan.

The motion planning system 305 can provide control commands to one or more vehicle controls 307. For example, the one or more vehicle controls 307 can include throttle systems, brake systems, steering systems, and other control systems, each of which can include various vehicle controls (e.g., actuators or other devices that control gas flow, steering, braking) to control the motion of the autonomous vehicle 102. The various vehicle controls 307 can include one or more controllers, control devices, motors, and/or processors.

The vehicle controls 307 includes a brake control module 320. The brake control module 320 is configured to receive a braking command and bring about a response by applying (or not applying) the vehicle brakes. In some examples, the brake control module 320 includes a primary system and a secondary system. The primary system receives braking commands and, in response, applies brakes of the autonomous vehicle 102. The secondary system is configured to determine a failure of the primary system to apply the brakes of the autonomous vehicle 102 in response to receiving the braking command.

A steering control system 332 is configured to receive a steering command and bring about a response in the steering mechanism of the autonomous vehicle 102. The steering command is provided to a steering system to provide a steering input to steer the autonomous vehicle 102.

A lighting/auxiliary control module 336 receives a lighting or auxiliary command. In response, the lighting/auxiliary control module 336 controls a lighting and/or auxiliary system of the autonomous vehicle 102. Controlling a lighting system may include, for example, turning on, turning off, or otherwise modulating headlines, parking lights, running lights, etc. Controlling an auxiliary system may include, for example, modulating windshield wipers, a defroster, etc.

A throttle control system 334 is configured to receive a throttle command and bring about a response in the engine speed or other throttle mechanism of the vehicle. For example, the throttle control system 334 can instruct an engine and/or engine controller, or other propulsion system component to control the engine or other propulsion system of the autonomous vehicle 102 to accelerate, decelerate, or remain at its current speed.

Each of the perception system 303, the prediction system 304, the motion planning system 305, the commander system 311, the navigator system 313, and the localizer system 330, can be included in or otherwise be a part of a vehicle autonomy system 302 configured to control the autonomous vehicle 102 based at least in part on data obtained from one or more sensors 301. For example, data obtained by one or more sensors 301 can be analyzed by each of the perception system 303, the prediction system 304, and the motion planning system 305 in a consecutive fashion in order to control the autonomous vehicle 102. While FIG. 3 depicts elements suitable for use in a vehicle autonomy system according to example aspects of the present disclosure, one of ordinary skill in the art will recognize that other vehicle autonomy systems can be configured to control an autonomous vehicle based on sensor data.

The vehicle autonomy system 302 includes one or more computing devices, which may implement all or parts of the perception system 303, the prediction system 304, the motion planning system 305 and/or the localizer system 330. Descriptions of hardware and software configurations for computing devices to implement the vehicle autonomy system 302 are provided herein at FIGS. 10 and 13.

Figure 4:
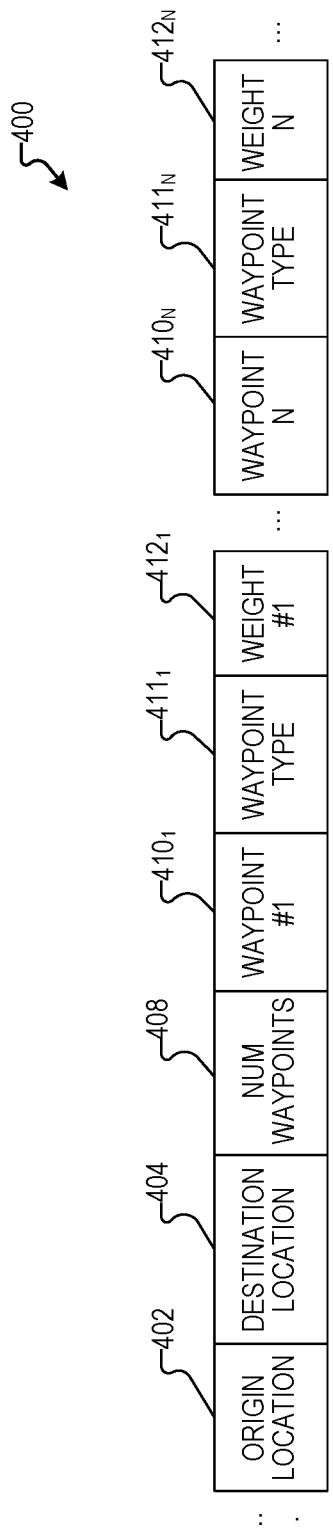
FIG. 4 shows an example portion of routing information that may be transmitted from the arranger to an autonomous vehicle.

FIG. 4 shows an example portion of routing information that is transmitted from the arranger 104 to an autonomous vehicle 102 in some embodiments. The routing information 400 may, in some aspects, be included in any of the routing information 112A-C discussed above with respect to FIG. 1. The routing information 400 includes one or more of an origin location field 402, destination location field 404, and a number of waypoints indication 408. The number of waypoints indication 408 is followed by one or more repeating triplets of fields, each triplet including a waypoint identification $410_{1 \ldots N}$, a waypoint type field $411_{1 \ldots N}$ and a weight assigned to the respective waypoint $412_{1 \ldots N}$. The waypoint indication fields $410_{1 \ldots N}$ may define a location of a waypoint. For example, the waypoint indication fields $410_{1 \ldots N}$ may store geodetic coordinates, such as latitude and longitude values for the respective waypoint. The type fields $411_{1 \ldots N}$ indicate a type of waypoint. For example, the type fields $411_{1 \ldots N}$ may indicate whether the waypoint represents a four way stop, a center of a traffic circle, or a freeway on ramp. The weight fields $412_{1 \ldots N}$ store a weight associated with the corresponding waypoint. The weight may indicate, in some aspects, a currency value associated with an autonomous vehicle reaching or visiting the waypoint in some aspects. In some other aspects, the weight may indicate a relative importance of the waypoint in the route defined by the route information 400. In some aspects, the weights, such as those included in the fields $412_{1 \ldots N}$, are not includes in the route information 400. Similarly, the waypoint type information $411_{1 \ldots N}$ may also be omitted from the route information 400 in some embodiments.

Figure 5:
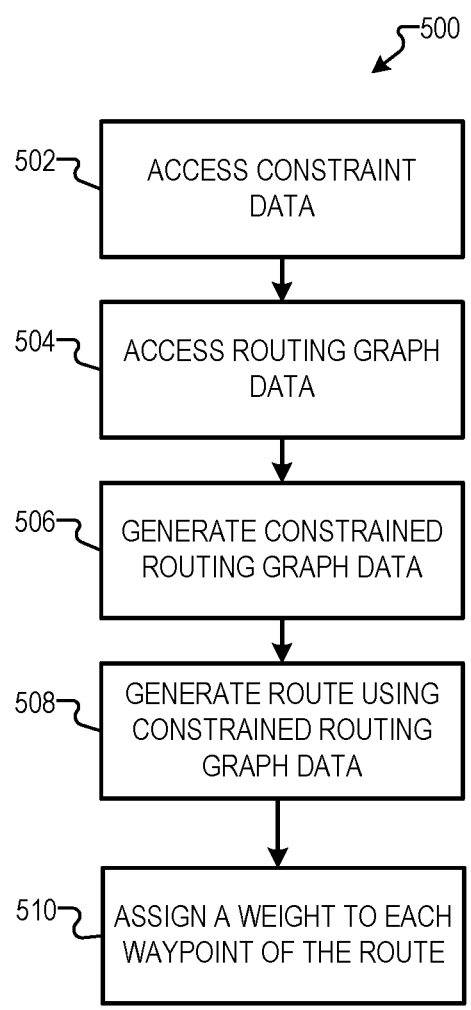
FIG. 5 is a flowchart showing one example of a process flow that can be executed by a routing engine to generate a route for an autonomous vehicle using constraint data and a routing graph to generate a constrained routing graph.

FIG. 5 is a flowchart showing one example of a process flow 500 that can be executed by a routing engine, such as navigator/routing engine 106, to generate a route for an autonomous vehicle using constraint data and a routing graph to generate a constrained routing graph. The process flow 500 can be executed by routing engines in a variety of contexts. In some examples, the process flow 500 is executed by a routing engine that is implemented and/or used in conjunction with a navigator system or other remote system, such as the navigator/routing engine 106.

At operation 502, the routing engine accesses constraint data. Constraint data can include, for example, vehicle capability data 210, operational constraint data 212, and/or policy data 214. Constraint data can be accessed in any suitable manner. In examples where the routing engine is implemented onboard a vehicle, constraint data is stored locally at the vehicle and/or received from a remote origin. In examples where the routing engine is implemented at an arrangement system, such as the arranger 104, the constraint data can be stored at the arrangement system and/or received from a remote origin. At operation 504, the routing engine accesses routing graph data, such as from the routing graph 216. The accessed routing graph data can include some or all of the routing graph.

At operation 506, the routing engine generates constrained routing graph data. This includes applying the constraint data accessed at operation 502 to the routing graph data accessed at operation 504. Consider an example constraint that describes a route component property and a corresponding routing graph modification. The routing engine applies the constraint by identifying route components from the routing graph (or considered portion thereof) that are described by the route component property. The routing engine then applies the routing graph modification to the identified route components. The constrained routing graph generated at operation 506 can include some or all of the routing graph accessed at 504. In some examples, as described herein, the routing engine can generate a routing graph for a sub-set or portion of the routing graph.

At operation 508, the routing engine generates a route using the constrained routing graph data generated at operation 506. In some embodiments, the generated route is the lowest cost set of connected route components from a vehicle start point to a vehicle end point. Any suitable path planning algorithm can be used, for example, as described herein. The routing engine can cause an autonomous vehicle to execute the generated route. For example, when the routing engine is implemented in a dispatch system, such as the arranger 104 of FIG. 1, the routing engine (e.g., via the dispatch system) can transmit the route to an autonomous vehicle, which begins to control the vehicle along the route.

In operation 510, a weight is assigned to each waypoint of the route. In some aspects, each waypoint is assigned an equal weight. In some other aspects, an assigned weight is proportional to a distance between a previous waypoint and a waypoint being assigned the weight. In some aspects, the assigned weight is based on a historical record of services provided within a predetermined proximity of the waypoint. For example, in some embodiments, waypoints having a higher number of rider drop offs and/or pick-ups within a predetermined proximity of the waypoint are assigned higher weights than other waypoints having a lower number of rider drop offs and/or pick-ups with the predetermined proximity.

Figure 6:
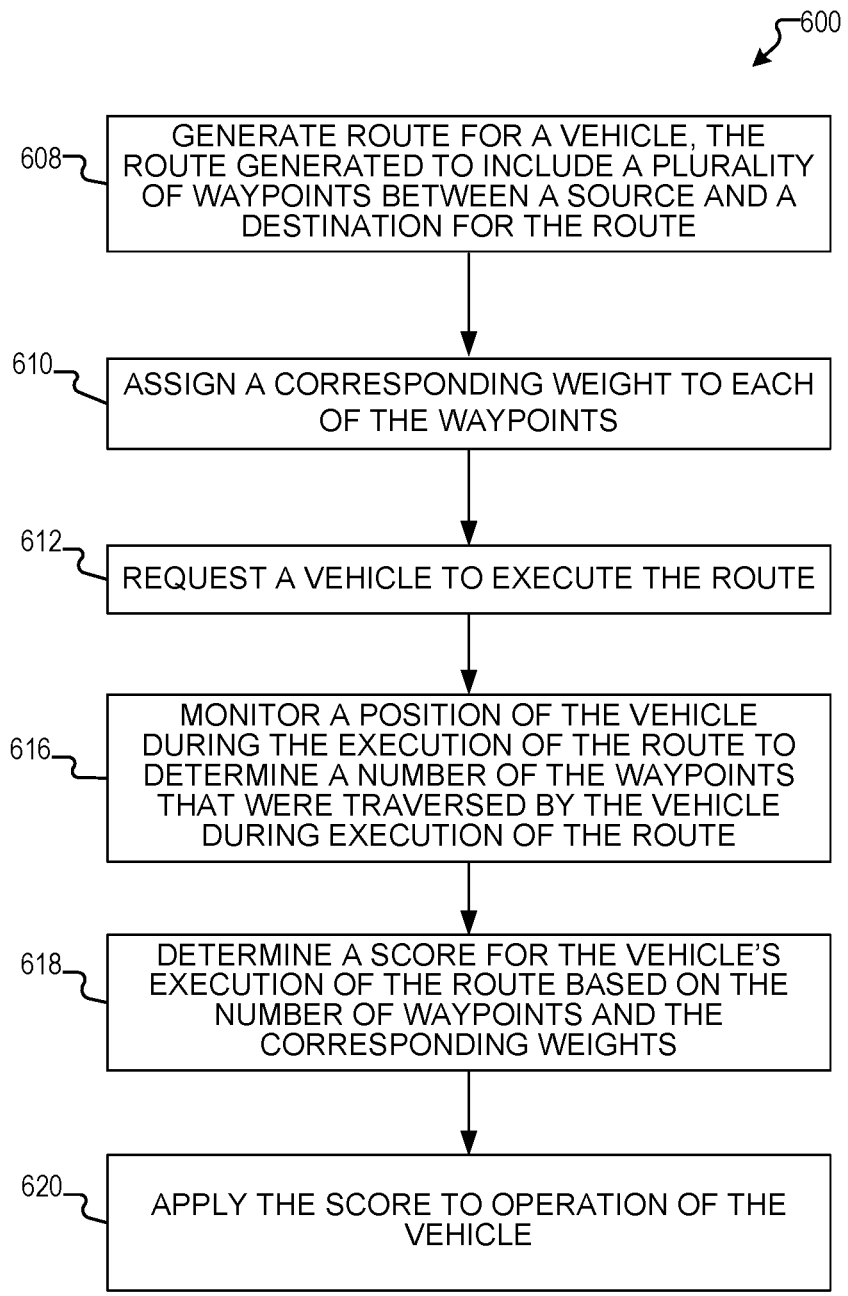
FIG. 6 is a flowchart showing one example of a process flow that can be executed by the navigator/routing engine, to generate routes.

FIG. 6 is a flowchart showing one example of a process flow 600 that can be executed by the navigator/routing engine 106, to generate routes. The process flow 600 shows just one example way that the navigator/routing engine 106 can generate routes. Any suitable routing method can be used. In some aspects, one or more of the functions discussed below are performed by hardware processing circuitry. For example, instruction stored in an electronic hardware memory may configure the hardware processing circuitry to perform one or more of the functions discussed below with respect to FIG. 6.

In operation 608, a route between a route origin location and a route destination location is generated. The route is generated to include a plurality of waypoints. Each of the waypoints defines a geographic location to be traversed by a vehicle executing the route.

In operation 610, a weight is assigned to each of the waypoints. In some aspects, the weight is a numerical integer or floating-point value. The weights are assigned in a variety of manners depending on the embodiment. For example, in some embodiments, each waypoint is assigned an equal weight. In other embodiments, weights are assigned based on a measurement of vehicular activity at or in proximity to each of the corresponding waypoints.

In operation 612, a vehicle is requested to execute the route. For example, as described above, the arranger 104 may communicate the route and the waypoints to the vehicle autonomy system 302. In some aspects, the arranger 104 may transmit route information including one or more of the fields discussed above with respect to FIG. 4.

In operation 616, a position of the vehicle is monitored during the execution of the route to determine which of the waypoints were traversed by the vehicle. In some aspects, if the vehicle travels within a predetermined threshold distance of the defined waypoints during execution of the route, it is determined to have traversed the waypoint. In some aspects, as discussed above, the monitoring is accomplished via the localizer system 330, which may periodically transmit vehicle position updates to the route adherence scoring component 108. Instructions in the route adherence scoring component 108 may implement one or more of the functions of operation 616.

In some alternative aspects, the monitoring of the vehicle position may occur after the route has been completed. For example, in some aspects, the localizer system 330 may provide periodic position updates to a log file, stored on the vehicle itself or offloaded to a database. In these aspects, operation 616 may determine which of the waypoints were traversed by the vehicle during execution of the route, directly or indirectly, via the log file.

In operation 618, a score for the vehicle's execution of the route is determined. The score is determined based on a number of waypoints traversed during execution of the route. In some aspects, the score is further determined based on weights assigned to each of the waypoints as described above with respect to operation 612.

In operation 620, the score is applied to operation of the autonomous vehicle. In some aspects, the score is applied to control an arranger. The arranger may assign service requests to autonomous vehicles of various types based on aggregated scores of vehicles of the same type. In some aspects, the score is used to allocate currency to operators of the autonomous vehicle. In some aspects, operation 620 is performed by the score application component 110, discussed above with respect to FIG. 1. In some other aspects, the score is applied to control payment allocations to the vehicle or to an operator of the vehicle. For example, as discussed below with respect to FIG. 7, the score may determine how at least a portion of a fare due to the operator of the autonomous vehicle is paid.

Figure 7:
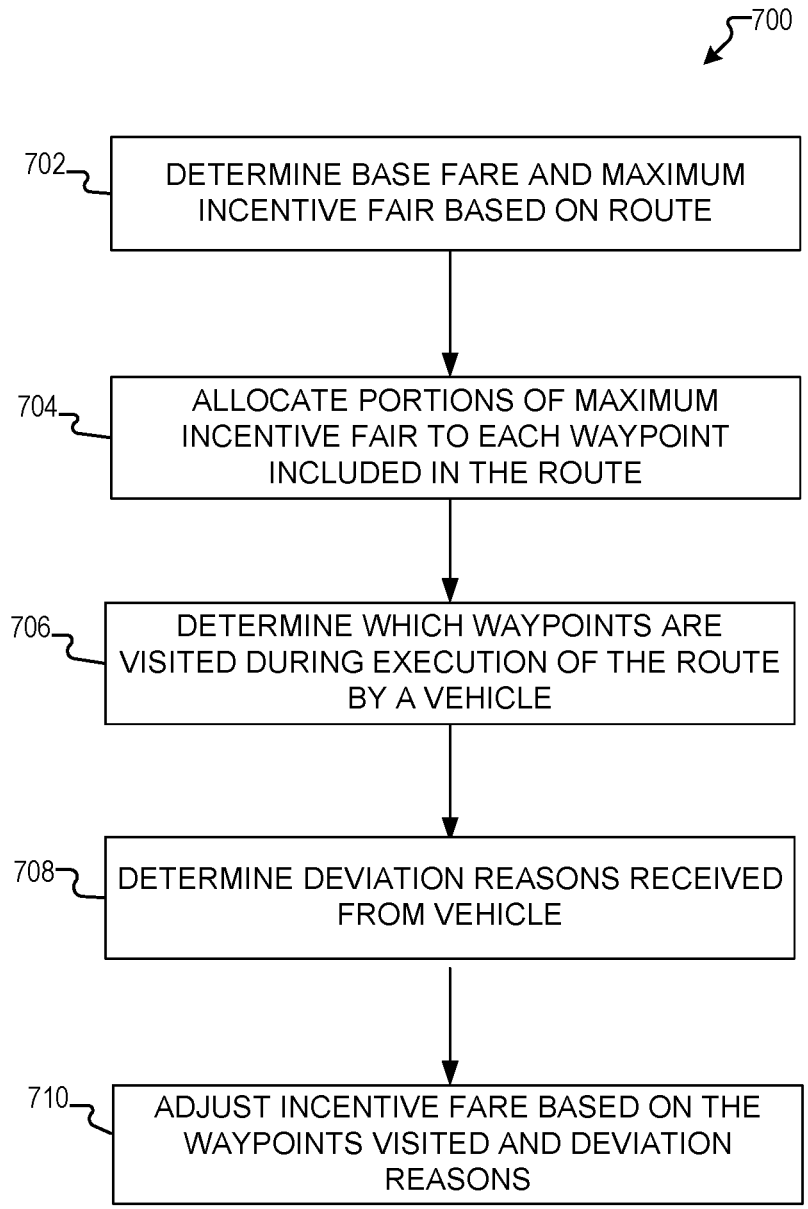
FIG. 7 is a flowchart showing one example of a process flow that can be executed by a score application component.

FIG. 7 is a flowchart showing one example of a process flow 700 that can be executed by the score application component 110. The process flow 700 shows just one example way that scores are applied in the disclosed embodiments. Other applications of scores generated by the route adherence scoring component 108 are contemplated. In some aspects, one or more of the functions discussed below are performed by hardware processing circuitry. For example, instructions stored in an electronic hardware memory may configure the hardware processing circuitry to perform one or more of the functions discussed below with respect to FIG. 7.

In operation 702, a base fare and a maximum incentive fare are determined based on a route. For example, in some aspects, a route generated by the navigator/routing engine 106 includes a plurality of waypoints to be traversed from an origin location of the route to a destination location of the route. The navigator/routing engine 106 determines a total fare for the route. For example, in some embodiments, the fare is determined based on a distance between the origin location and destination location for the route. The fare may further be determined, in some aspects, by a time of day and/or date. The navigator/routing engine 106 may then divide the fare into at least two portions a first fixed position and a second variable portion. In some embodiments, the division of the far is based on a predetermined fixed percentage. In some aspects, the fixed percentage may vary based on an operator of an autonomous vehicle assigned to the route (e.g., the percentage may vary based on a contractual arrangement was various autonomous vehicle OEMs in some embodiments). In some aspects, the percentage may not be fixed but instead may vary by route. For example, longer routes are assigned a higher percentage of the far to the variable portion than relatively shorter routes in some embodiments.

In operation 704, portions of the maximum incentive fare are allocated to each waypoint included in the route. In some aspects, the portions of the maximum incentive fare are allocated to each waypoint according to weights assigned to each of the waypoints. For example, as discussed above with respect to operation 610, a weight is assigned to each waypoint for a route in some embodiments.

In operation 706, a determination of which waypoints are visited or traversed during execution of the route by a vehicle is made. As discussed above, in some aspects, the route adherence scoring component 108 may receive periodic updates on vehicle position from the localizer system 330. The route adherence scoring component 108 may compare the position of the vehicle to positions of waypoints included in a route being executed by the vehicle and determine whether the vehicle has traversed the waypoint based on the comparison. For example, in some embodiments, if the vehicle comes within a predetermined threshold distance of the waypoint, the waypoint is considered traversed, whereas if the vehicle does not get within the predetermined threshold distance, the waypoint remains untraversed.

In operation 708, deviation reasons are obtained or received from the vehicle. The deviation reasons may indicate one or more reasons why a vehicle did not traverse one or more particular waypoints during execution of the route. For example, the decision reasons may indicate that a waypoint was unavailable because of a detour or accident blocking access to the waypoint. Alternatively, the deviation reason may indicate that traversing the waypoint would require the vehicle to violate its operating limitations. As one example, some autonomous vehicles are unable to navigate traffic circles or perform unprotected left turns. Traversing a particular waypoint may require one or more of these operations, and thus the autonomous vehicles with these limitations may bypass the waypoint and identify an alternate path to a subsequent waypoint and/or a final destination of the route.

In operation 710, an adjustment in the incentive fare paid to the operator of the autonomous vehicle is performed based on the waypoints traversed by the autonomous vehicle and any deviation reasons received from the vehicle. In some aspects, a deviation reason associated with a waypoint may meet a criterion. In response, the waypoint is considered traversed when it may not have been physically traversed by the autonomous vehicle during the route (as determined by 706).

In some embodiments, the first fixed portion is paid to an operator of a vehicle assigned to the route upon successful completion of the route or some time thereafter. In these embodiments, the variable portion of the fare is determined based on execution of the route by the autonomous vehicle. For example, in some aspects, the variable portion is paid in proportion to a number of waypoints traversed during execution of the route relative to a total number of waypoints originally specified by the navigator/routing engine. In some aspects, the variable portion is paid in proportion to the weights assigned to each of the waypoints. For example, if an autonomous vehicle traversed a particular waypoint, a portion of the variable portion of the fare is paid to an operator of the autonomous vehicle in proportion to the weight assigned to the waypoint relative to an aggregation of assigned weights for the waypoints included in the route.

Figure 8:
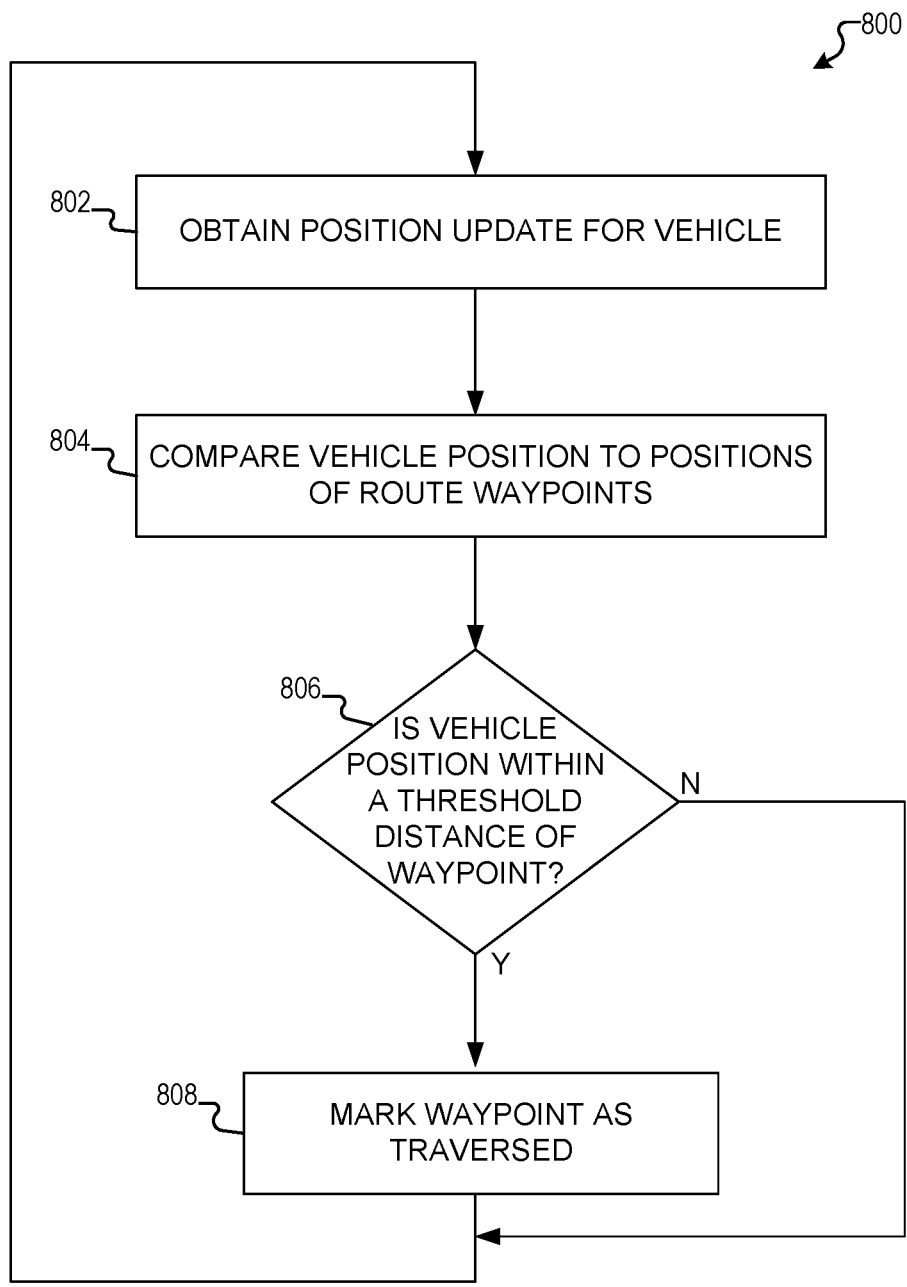
FIG. 8 is a flowchart showing one example of a process flow that can be executed by a route adherence scoring component.

FIG. 8 is a flowchart showing one example of a process flow 800 that can be executed by the route adherence scoring component 108. The process flow 800 shows just one example method of routes that are monitored in at least some of the disclosed embodiments Other methods of monitoring by the route adherence scoring component 108 are contemplated. In some aspects, one or more of the functions discussed below may be performed by hardware processing circuitry. For example, in some embodiments, instructions stored in an electronic hardware memory configure the hardware processing circuitry to perform one or more of the functions discussed below with respect to FIG. 8.

In operation 802, a position update for a vehicle is obtained. In some aspects, the position update is obtained from the vehicle in "real time" as the vehicle executes a route. In some aspects, the position update is received by the route adherence scoring component 108. In some other aspects, the position update is offline, sometime after the route execution is completed. For example, in some aspects, the process flow 800 may read the position update from a vehicle position log, or data derived from a vehicle position log. For example, a vehicle may record position information periodically and store this information in a stable storage, such as a log file. The log file may then be updated to a central system in some embodiments, and data derived from the log obtained in operation 802.

In operation 804, the position of the vehicle is compared to positions of waypoints included in a route being executed by the vehicle.

Decision operation 806 determines whether the vehicle position is within a threshold distance of any of the waypoints included in the vehicle route. If the vehicle's position is within the threshold distance, process flow 800 moves from decision operation 806 to operation 808, which marks the waypoint as traversed. Process flow 800 may periodically or iteratively repeat for a single vehicle route. Multiple invocations of process flow 800 are performed by some of the disclosed embodiments, each invocation monitoring vehicle position for a single vehicle.

Figure 9:
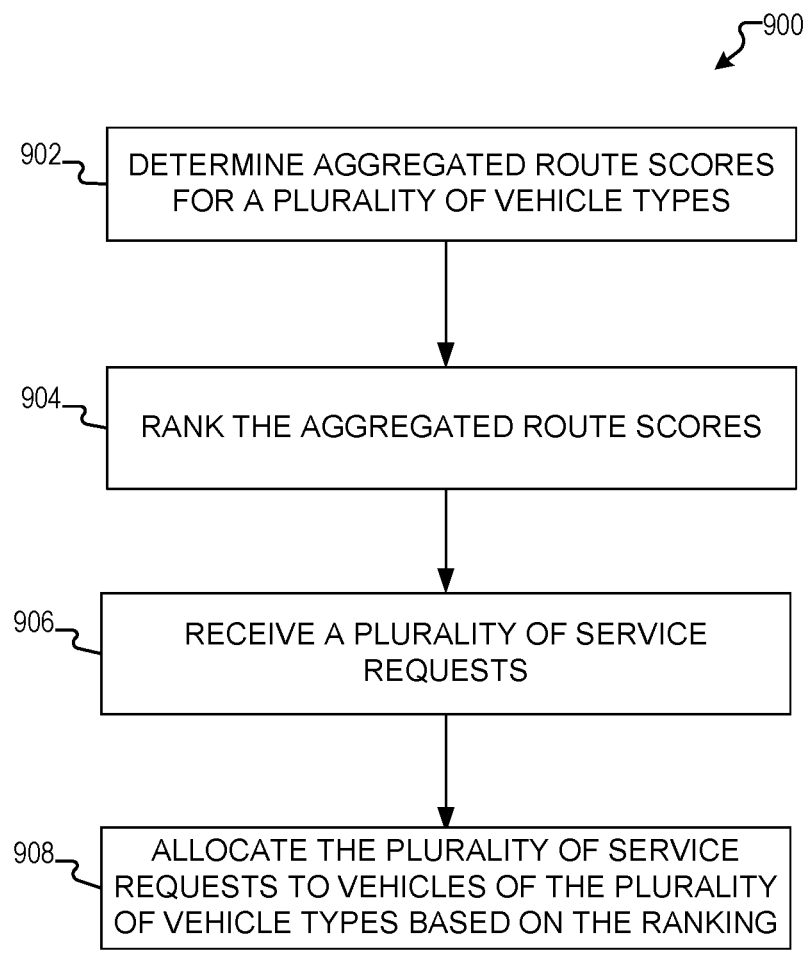
FIG. 9 is a flowchart showing one example of a process flow that can be executed by the route adherence scoring component.

FIG. 9 is a flowchart showing one example of a process flow 900 that can be executed by the route adherence scoring component 108. The process flow 900 shows just one example of how routes are monitored in some of the disclosed embodiments. Other methods of monitoring by the route adherence scoring component 108 are contemplated. In some aspects, one or more of the functions discussed below are performed by hardware processing circuitry. For example, instructions stored in an electronic hardware memory configure the hardware processing circuitry to perform one or more of the functions discussed below with respect to FIG. 9 in some embodiments.

In operation 902, aggregated route scores are determined for a plurality of vehicle types. In some aspects, a vehicle type identifies vehicles operated by a particular operator, or vehicles manufactured by a particular manufacturer. Each of the aggregated route scores for a particular vehicle type are based on a plurality of route scores for a plurality of routes executed by vehicles of the respective vehicle type. The route scores are aggregated via averaging, addition, median, variance, standard deviation, or other statistical measurement which may vary by embodiment.

In operation 904, the aggregated route scores for each of the vehicle types are ranked. In other words, the vehicle types are placed in an order based on each of the vehicle types aggregated route score. Thus, a vehicle type having the "best" or "highest" aggregated route score is ranked first in some embodiments of process flow 900. Other ranking methods are contemplated.

In operation 906, a plurality of service requests are received. For example, the plurality of service requests is received by rider applications running on mobile devices of potential riders in some embodiments. In some embodiments, each of the plurality of service requests specifies a pick-up location and a destination location for a service.

In operation 908, the plurality of service requests are allocated to vehicles of the plurality of vehicle types based on the ranking. For example, in some aspects, the service requests are allocated to vehicles of the different plurality of vehicle types in proportion to the aggregated route scores for each respective vehicle type.

In some aspects, individual aggregated scores are generated for each waypoint included in a route assigned to an autonomous vehicle. Thus, these individual aggregated scores indicate how well a particular autonomous vehicle or autonomous vehicle type (when aggregated by autonomous vehicle type) manages each of the individual waypoints. In some embodiments, new routes are assigned to autonomous vehicles based on the aggregated scores for waypoints included in the new routes. Thus, if past performance of an autonomous vehicle (or autonomous vehicle type) indicates that it never visits a particular waypoint, or has a low probability (below a threshold probability) of visiting a particular waypoint, new routes including that waypoint may not be assigned to that autonomous vehicle (or autonomous vehicle type).

In some aspects, the waypoints may also be categorized by type. For example, in some embodiments, a first waypoint may represent a four way stop intersection, and classified as a first type of waypoint, and a second waypoint may represent an entrance to a highway on-ramp, and be classified as a second type of waypoint. The aggregated scores are similarly aggregated by autonomous vehicle (or autonomous vehicle type) and waypoint type. Routes may then be assigned to autonomous vehicles (or autonomous vehicle types) based on waypoint types included in a particular route, and further based on scores for those waypoint types of the autonomous vehicles (or their respective autonomous vehicle type). In some aspects, waypoint scores and/or waypoint type scores as described above may be used to update vehicle capability data 210 and/or operational constraint data 212, and/or policy data 214. For example, under some conditions, a waypoint score or a waypoint type score for a particular type of autonomous vehicle meets a criterion. In some embodiments, the criterion indicates that the particular type of autonomous vehicle always avoids the particular waypoint type associated with the score. Based on meeting this criterion, one or more of the capability data 210 and/or operational constraint data 212, and/or policy data 214 are updated such that routes generated for the particular type of autonomous vehicle do not include waypoints of the particular type.

Figure 10:
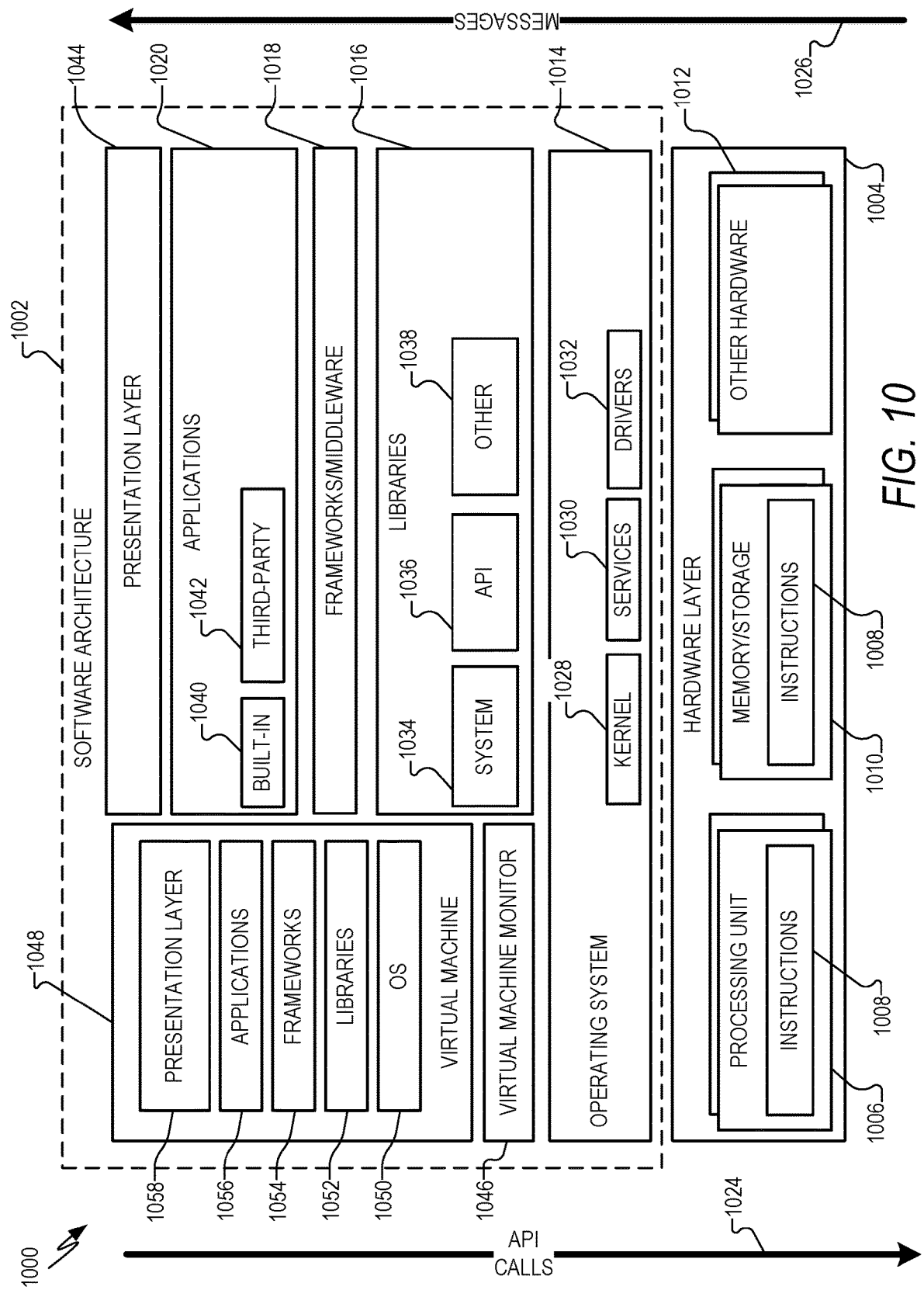
FIG. 10 is a block diagram showing one example of a software architecture for a computing device.

FIG. 10 is a block diagram 1000 showing one example of a software architecture 1002 for a computing device. In some embodiments, the software architecture 1002 is used in conjunction with various hardware architectures, for example, as described herein. FIG. 10 is merely a non-limiting example of a software architecture 1002 and many other architectures may be implemented to facilitate the functionality described herein. A representative hardware layer 1004 is illustrated and can represent, for example, any of the above-referenced computing devices. In some examples, the hardware layer 1004 may be implemented according to an architecture 1300 of FIG. 13 and/or the software architecture 1002 of FIG. 10.

The representative hardware layer 1004 comprises one or more processing units 1006 having associated executable instructions 1008. The executable instructions 1008 represent the executable instructions of the software architecture 1002, including implementation of the methods, modules, components, and so forth discussed above with respect to any of FIGS. 1-9 and/or 11-20. The hardware layer 1004 also includes memory and/or storage modules 1010, which also have the executable instructions 1008. The hardware layer 1004 may also comprise other hardware 1012, which represents any other hardware of the hardware layer 1004, such as the other hardware illustrated as part of the architecture 1300.

In the example architecture of FIG. 10, the software architecture 1002 may be conceptualized as a stack of layers where each layer provides particular functionality. For example, the software architecture 1002 may include layers such as an operating system 1014, libraries 1016, frameworks 1018, applications 1020, and a presentation layer 1044. Operationally, the applications 1020 and/or other components within the layers may invoke API calls 1024 through the software stack and receive a response, returned values, and so forth illustrated as messages 1026 in response to the API calls 1024. The layers illustrated are representative in nature and not all software architectures have all layers. For example, some mobile or special-purpose operating systems may not provide a frameworks 1018 layer, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of a hardware or software interrupt and, in response, cause the software architecture 1002 to pause its current processing and execute an ISR when an interrupt is received. The ISR may generate an alert.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1016 may provide a common infrastructure that may be used by the applications 1020 and/or other components and/or layers. The libraries 1016 typically provide functionality that allows other software modules to perform tasks in an easier fashion than by interfacing directly with the underlying operating system 1014 functionality (e.g., kernel 1028, services 1030, and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks 1018 (also sometimes referred to as middleware) may provide a higher-level common infrastructure that may be used by the applications 1020 and/or other software components/modules. For example, the frameworks 1018 may provide various graphical user interface (GUI) functions, high-level resource management, high-level location services, and so forth. The frameworks 1018 may provide a broad spectrum of other APIs that may be used by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. The third-party applications 1042 may include any of the built-in applications 1040 as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 1042 may invoke the API calls 1024 provided by the mobile operating system such as the operating system 1014 to facilitate functionality described herein.

The applications 1020 may use built-in operating system functions (e.g., kernel 1028, services 1030, and/or drivers 1032), libraries (e.g., system libraries 1034, API libraries 1036, and other libraries 1038), or frameworks 1018 to create user interfaces to interact with users of the system. Alternatively, or additionally, in some systems, interactions with a user may occur through a presentation layer, such as the presentation layer 1044. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 10, this is illustrated by a virtual machine 1048. A virtual machine creates a software environment where applications/modules can execute as if they were executing on a hardware computing device. The virtual machine 1048 is hosted by a host operating system (e.g., the operating system 1014) and typically, although not always, has a virtual machine monitor 1046, which manages the operation of the virtual machine 1048 as well as the interface with the host operating system (e.g., the operating system 1014). A software architecture executes within the virtual machine 1048, such as an operating system 1050, libraries 1052, frameworks 1054, applications 1056, and/or a presentation layer 1058. These layers of software architecture executing within the virtual machine 1048 can be the same as corresponding layers previously described or may be different.

Figure 11:
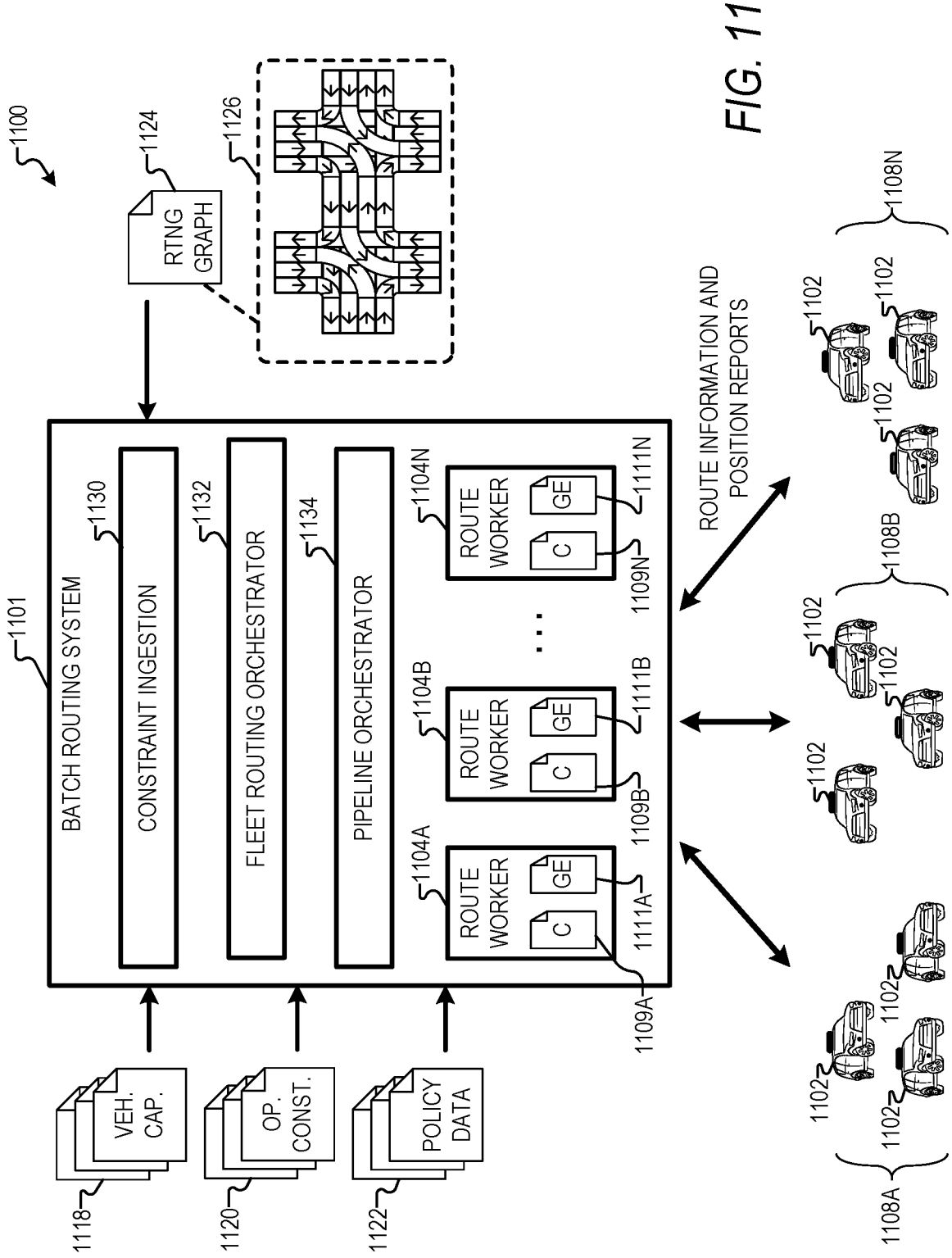
FIG. 11 is a diagram showing one example of an environment including a batch routing and a number of autonomous vehicles.

FIG. 11 is a diagram showing one example of an environment 1100 including a batch routing system 1101 and a number of autonomous vehicles 1102. The autonomous vehicles 1102 may be analogous or interchangeable with any of the autonomous vehicles 102A-C discussed above. The batch routing system 1101 acts as a route planner to the autonomous vehicles 1102, for example, similar to the navigator/routing engine 106 discussed above with respect to FIG. 1.

The environment 1100 shows autonomous vehicles 1102 of three different vehicle types 1108A, 1108B, 1108N. Although three different vehicle types 1108A, 1108B, 1108N are shown in FIG. 11, the batch routing system 1101 can be configured to provide route costing to dispatch service requests to more or fewer different vehicle types.

In some examples, the different vehicle types 1108A, 1108B, 1108N of autonomous vehicles 1102 have different capabilities. For example, different vehicle types 1108A, 1108B, 1108N of autonomous vehicles 1102 can have different vehicle autonomy systems. This can include, for example, vehicle autonomy systems created by different manufacturers or designers, vehicle autonomy systems having different software versions or revisions, etc. Also, in some examples, different vehicle types 1108A, 1108B, 1108N of vehicles 102 can have different remote sensor sets. For example, one type 1108A of autonomous vehicles 1102 may include a LIDAR remote sensor while another vehicle type 1108N of the autonomous vehicles 1102 may include stereoscopic cameras and omit a LIDAR remote sensor. In some examples, different types 1108A, 1108B, 1108N of autonomous vehicles 1102 can also have different mechanical particulars. For example, one vehicle type 1108A of vehicle may have all-wheel drive while another type 1108B may have front-wheel drive.

Because of their differences, different vehicle types 1108A, 1108B, 1108N of autonomous vehicles 1102 may be routed differently. For example, different vehicle types 1108A, 1108B, 1108N of autonomous vehicles 1102 may have different routing constraints describing the route components that the vehicles are capable of traversing and/or affecting the cost of traversing the route component. Accordingly, the batch routing system 1101 may generate route costs for different vehicle types 1108A, 1108B, 1108N of autonomous vehicles 1102 differently.

The batch routing system 1101 may generate route costs for the autonomous vehicles 1102 using constraint data such as vehicle capability data 1118, operational constraint data 1120, and/or policy constraint data 1122. For example, constraint data may be applied to one or more routing graphs 1124 to generate constrained routing graphs, as described herein. The routing graph 1124 represents roadways in a geographic area with a set of route components. In FIG. 11, break-out window 1126 shows example route components making up part of the routing graph 1124. Route components in the break-out window 1126 are illustrated as shapes with arrows indicating the directionality of the route components. Route components can be connected to one another at the routing graph 1124, for example, according to directionality.

The constraint data, including vehicle capability data 1118, operational constraint data 1120, and policy constraint data 1122, indicates the constraints that are applied to a routing graph 1124 to generate the constrained routing graphs, as described herein. Generally, a constraint includes a constraint property or set of constraint properties describing route components subject to the constraint and one or more routing graph modifications for implementing the constraint. Routing graph modifications can include, for example, removing route components having the indicated property or properties from the routing graph, removing route component connections to route components having the indicated property or properties from the routing graph. Another example routing graph modification can include changing a cost associated with route component (e.g., a route component cost) and/or transitions to the route component.

Costs may be changed up or down. For example, if constraint data indicates that route components having a particular property or set of properties are disfavored, the costs to traverse and/or transition to the route components can be increased. On the other hand, if constraint data indicates that route components having a particular constraint property or set of constraint properties are favored, the costs to traverse and/or transition to the route components can be decreased.

Routing graph modifications can relate to route components that have the indicated constraint property or properties. For example, if a policy constraint forbids routing a vehicle through route components that include or are in a school zone, a corresponding routing graph modification includes removing such school zone route components from the routing graph 1124 and/or removing transitions to such school zone route components. Routing graph modifications can, in some examples, describe changes to route components other than those having the identified properties. Consider an example constraint that is to avoid cul-de-sacs. The associated routing graph modification could involve removing route components that include cul-de-sacs and also removing route components that do not include cul-de-sacs, but can lead only to other route components that include cul-de-sacs.

Vehicle capability data 1118 describes constraints associated with various autonomous vehicles 1102 of different vehicle types 1108A, 1108B, 1108N. For example, the vehicle capability data 1118 can be and/or be derived from Operational Domain (OD) or Operational Design Domain (ODD) data, if any, provided by the vehicle's manufacturer. Constraints described by vehicle capability data 1118 can include constraint data identifying a route segment property or properties (e.g., includes an unprotected left, is part of a controlled access highway, etc.) and routing graph modification data indicating what is to be done to route components having the indicated property or properties. For example, route components that a particular vehicle type 1108A, 1108B, 1108N is not capable of traversing can be removed from the routing graph or can have connectivity data modified to remove transitions to those route components. For example, the batch routing system 1101 can remove one or more connections to the route component. If the route component properties indicate a maneuver that is undesirable for a vehicle, but not forbidden, then the routing graph modification data can call for increasing the cost of an identified route component or transitions thereto.

Operational constraint data 1120 describes operational constraints. Operational constraints can be based, for example, on the state of one or more roadways. For example, if a roadway is to be closed for a parade or for construction, an operational constraint identifies properties (e.g., names or locations) of route segments that are part of the closure and an associated routing graph modification (e.g., removing the route components, removing transitions to the route components, etc.).

Policy constraint data 1122 can describe policy constraints. Policy constraints include route component properties that identify route components subject to a policy constraint and corresponding routing graph modifications. Policy constraints refer to types of route segments that it is desirable for a vehicle to avoid or prioritize. An example policy constraint is to avoid route components that are in or pass through school zones. Another example policy constraint is to avoid routing vehicles in residential neighborhoods. Yet another example policy constraint is to favor routing vehicles on controlled-access highways, if available. Policy constraints can apply to some vehicles, some vehicle types, all vehicles, or all vehicle types.

The batch routing system 1101 is configured to ingest the constraint data 1118, 1120, and/or 1122 and generate route costs requested by the autonomous vehicles 1102 in view of the constraint data 1118, 1120, and/or 1122. A constraint ingestion subsystem 1130 receives the constraint data 1118, 1120, and/or 1122 and prepares the constraint data 1118, 1120, and/or 1122 for use in routing. For example, the constraint ingestion subsystem 1130 may receive and format the constraint data 1118, 1120, and/or 1122. In some examples, this includes formatting the constraint data 1118, 1120, and/or 1122 to include a route component property or properties. In some examples, it may include generating metadata associating particular constraints with particular autonomous vehicles 1102 or vehicle types 1108A, 1108B, and/or 1108N.

The batch routing system 1101 may also include a fleet routing orchestrator 1132. The fleet routing orchestrator 1132 manages the provision of constraints described by the constraint data 1118, 1120, and/or 1122 to autonomous vehicles 1102 and/or route workers 1104A, 1104B, and/or 1104N as described herein. For example, the fleet routing orchestrator 1132 may categorize or otherwise organize constraints from the constraint data 1118, 1120, and/or 1122 according to the vehicle type 1108A, 1108B, 1108N to which the constraints apply.

In some examples, routes and route costs for the autonomous vehicles 1102 are generated by one or more route workers 1104A, 1104B, 1104N. Route workers 1104A, 1104B, 1104N are programs that can be initiated and stopped, for example, as needed. In some examples, route workers 1104A, 1104B, 1104N are configured to operate in parallel. For example, as one route worker 1104A generates route costs for one of the autonomous vehicles 1102, another route worker 1104B generates route costs for another of the autonomous vehicles 1102. A pipeline orchestrator 1134 manages the operation of the route workers 1104A. For example, the pipeline orchestrator may be configured to initiate and/or stop route workers 1104A, 1104B, 1104N, for example, based on demand.

Route workers 1104A, 1104B, 1104N can utilize constrained routing graphs 1109A, 1109B, 1109N. Constrained routing graphs 1109A, 1109B, 1109N can be generated by the route workers 1104A, 1104B, 1104N and/or by another component, such as the fleet routing orchestrator. Different route workers 1104A, 1104B, 1104N may use different constrained routing graphs 1109A, 1109B, 1109N. For example, different route workers 1104A, 1104B, 1104N may use constrained routing graphs 1109A, 1109B, 1109N generated from different routing graphs 1124, different portions of the routing graph 1124, and/or using different sets of constraints derived from the constraint data 1118, 1120, and/or 1122. For example, the fleet routing orchestrator 1132 and/or pipeline orchestrator 1134 may provide a route worker 1104A, 1104B, 1104N with a constrained routing graph 1109A, 1109B, 1109N and/or with a set of constraints particular to one of the autonomous vehicles 1102 that the route worker 1104A, 1104B, 1104N will service.

Route workers 1104A, 1104B, 1104N may generate routes, as described herein, by applying a path planning algorithm to the respective constrained routing graphs 1109A, 1109B, 1109N. For generating any given route, this may generate graph expansion data 1111A, 1111B, 1111N. Graph expansion data 1111A, 1111B, 1111N can be generated from expanding the constrained routing graph 1109A, 1109B, 1109N to generate potential connections between route components that can be used as a route. When one or more sets of potential connections of the graph expansion data 1111A, 1111B, 1111N span between a route start point and a route endpoint, the graph expansion data 1111A, 1111B, 1111N is used to find the set of potential connections with the lowest cost, which is the determined route.

Route workers 1104A, 1104B, 1104N can apply a path planning algorithm forwards or backwards. When a path planning algorithm is applied forwards, the route workers 1104A, 1104B, 1104N begin generating graph expansion data 1111A, 1111B, 1111N at one of the local route endpoints and continue expanding the respective routing graph 1109A, 1109B, 1109N until the expansion includes the endpoint. In other examples, the route workers 1104A, 1104B, 1104N apply a path planning algorithm backwards. When a path planning algorithm is applied backwards, the route workers 1104A, 1104B, 1104N begin generating graph expansion data 1111A, 1111B, 1111N at the trip endpoint and continue expanding the respective routing graph 1109A, 1109B, 1109N until the expansion includes the start point (here, for example, one or more of the local route endpoints).

In some examples, route workers 1104A, 1104B, 1104N apply path planning algorithms backwards. In this way, a route worker 1104A, 1104B, 1104N can cache graph expansion data 1111A, 1111B, 1111N resulting from the generation of one route for one of the autonomous vehicles 1102 and re-use the cached graph expansion data 1111A, 1111B, 1111N to find subsequent routes for the same one of the autonomous vehicles 1102.

In some examples, the pipeline orchestrator 1134 or other suitable component of the batch routing system 1101 may take advantage of cached graph expansion data 1111A, 1111B, 1111N by re-assigning route cost requests for a common one of the autonomous vehicles 1102 to the same route worker 1104A, 1104B, 1104N. For example, as described herein, an autonomous vehicle of the autonomous vehicles 1102 may make repeated route cost requests as it traverses to an endpoint. Because the endpoint may not change, the same graph expansion data 1111A, 1111B, 1111N can be re-used. Accordingly, route cost requests from the same vehicle, in some examples, are routed to the same route worker 1104A, 1104B, 1104N which can re-use cached graph expansion data 1111A, 1111B, 1111N to expedite processing.

In some examples, cached graph expansion data 1111A, 1111B, 1111N can also be exploited for different vehicles of the autonomous vehicles 1102 traveling to the same endpoint and/or endpoints that are near one another. For example, the batch routing system 1101, upon receiving a route cost request from one of the autonomous vehicles 1102, may determine if any route workers 1104A, 1104B, 1104N are utilizing the constrained routing graph 1109A, 1109B, 1109N for the same one of the autonomous vehicles 1102 and have previously handled a request from another one of the autonomous vehicles 1102 having an endpoint within a threshold distance of the endpoint of the current one of the autonomous vehicles 1102. If such a route worker 1104A, 1104B, 1104N exists, the current route cost request may be assigned to that route worker 1104A, 1104B, 1104N.

Figure 12:
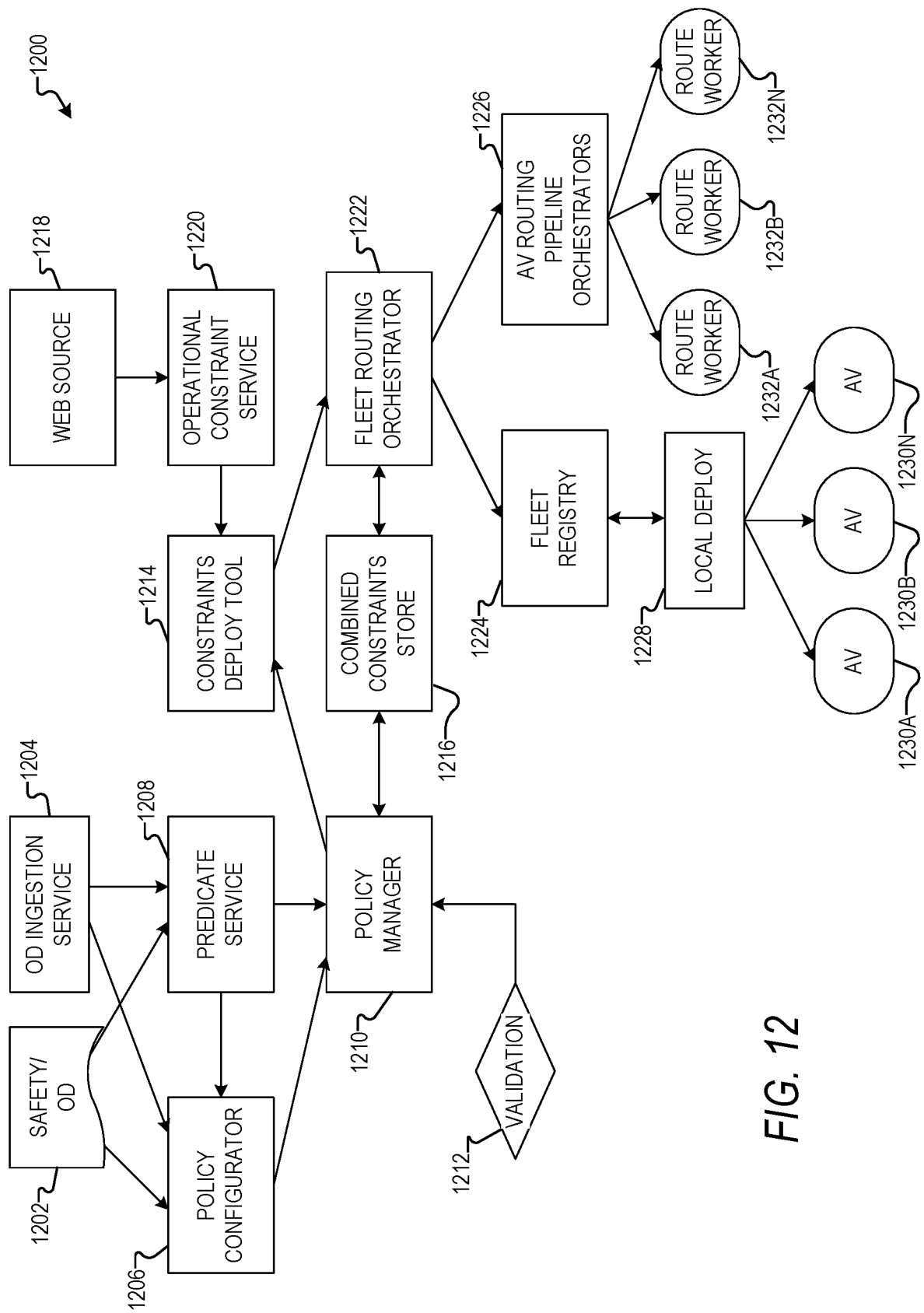
FIG. 12 is a diagram showing another example configuration of a batch routing system.

FIG. 12 is a diagram showing another example configuration of a batch routing system 1200. The batch routing system comprises a safety OD component 1202 and OD ingestion service 1204 that are configured to receive and process vehicle capability data. For example, the OD ingestion service 1204 receives and formats vehicle capability data, for example, from vehicle manufacturers. The safety OD component 1202 may receive policies, for example, from a user and/or as packaged data. For example, a manufacturer may provide one or more policies that are specific to a particular type of vehicle. In some examples, the safety/OD component can also receive from other origins, such as, for example, from a proprietor of the batch routing system 1200, etc.

Some vehicle capability data and policy data may be received in a form that includes formatted constraints ready to be applied to a routing graph. These constraints can be provided to the constraints deploy tool 1214 described herein. A policy configurator 1206 converts OD data and policy data into constraints that can be applied to a routing graph, as described herein. For example, the policy configurator 1206 can receive data that is not yet ready for provision to the constraints deploy tool 1214. A predicate service 1208 may work in conjunction with the policy configurator 1206 to generate constraints. For example, the predicate service 1208 can determine, for a constraint, the route component property or properties that should be true in order to apply the corresponding routing graph modification.

Constraint data generated by the policy configurator 1206 and/or the predicate service 1208 is provided to a policy manager 1210. The policy manager 1210 may work in conjunction with a validation tool 1212 to validate constraints. For example, the validation tool 1212 may be configured to verify that a constraint is logically and syntactically correct. In some examples, the validation tool 1212 is also configured to cryptographically sign a constraint. The policy manager 1210 provides validated constraints to a constraint deploy tool 1214 and, in some examples, to a combined constraints store 1216 where the constraints may be stored.

The constraints deploy tool 1214, in some examples, receives other constraints, such as operational constraints from an operational constraint service 1220. Operational constraints can include, for example, constraints related to traffic, weather, or other temporal roadway conditions. In some examples, operational constraints are received from a web origin, such as a traffic service, a weather service, etc. The operational constraint service 1220 converts operational data from one or more web origins 1218 into constraints that are provided to the constraints deploy tool 1214.

The constraints deploy tool 1214 manages constraints received from the various other components and provides those constraints to the fleet routing orchestrator 1222. The fleet routing orchestrator 1222 manages constraints by vehicle type and provides the constraints to a fleet registry tool 1224 and/or to an AV routing pipeline orchestrator 1226. The AV routing pipeline orchestrator 1226 manages one or more route workers 1232A, 1232B, 1232N. For example, the AV routing pipeline orchestrator 1226 starts route workers 1232A, 1232B, 1232N and stops route workers 1232A, 1232B, 1232N based on load and may provide route workers 1232A, 1232B, 1232N with constraints and/or a constrained routing graph based on the vehicle to be serviced.

The constraints deploy tool 1214, in some examples, also provides constraints to a fleet registry tool 1224. The fleet registry tool 1224 provides the constraints to a local deploy tool 1228 in communication with various autonomous vehicles 1230A, 1230B, 1230N. The fleet registry tool 1224 may provide constraints to the vehicles 1230A, 1230B, 1230N, for example, when the vehicles 1230A, 1230B, 1230N are available for communication. This can occur, for example, when the vehicles 1230A, 1230B, 1230N are in remote communication with the local deploy tool 1228 and/or when the vehicles 1230A, 1230B, 1230N are, for example, at a tender or other location where wired communication is available. Vehicles 1230A, 1230B, 1230N can use the constraints, in some examples, to generate local routes as described herein.

Figure 13:
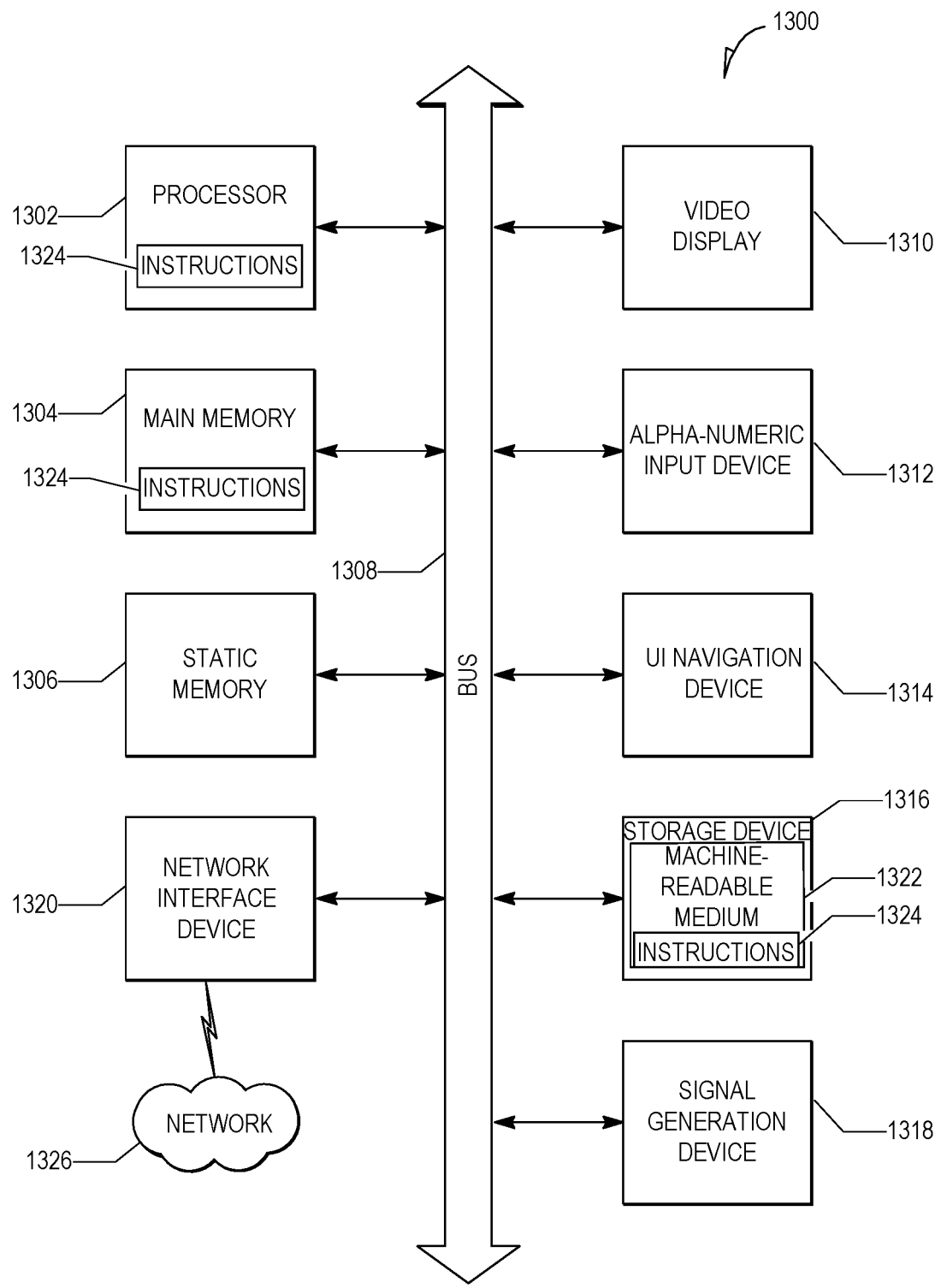
FIG. 13 is a block diagram illustrating a computing device hardware architecture.

FIG. 13 is a block diagram illustrating a computing device hardware architecture 1300, within which a set or sequence of instructions can be executed to cause a machine to perform examples of any one of the methodologies discussed herein. The hardware architecture 1300 describes a computing device for executing the vehicle autonomy system, described herein.

The architecture 1300 may operate as a standalone device or may be connected (e.g., networked) to other machines. In a networked deployment, the architecture 1300 may operate in the capacity of either a server or a client machine in server-client network environments, or it may act as a peer machine in peer-to-peer (or distributed) network environments. The architecture 1300 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1300 includes a processor unit 1302 comprising at least one processor (e.g., a central processing unit (CPU), a graphics processing unit (GPU), or both, processor cores, compute nodes). The architecture 1300 may further comprise a main memory 1304 and a static memory 1306, which communicate with each other via a link 1308 (e.g., bus). The architecture 1300 can further include a video display unit 1310, an input device 1312 (e.g., a keyboard), and a UI navigation device 1314 (e.g., a mouse). In some examples, the video display unit 1310, input device 1312, and UI navigation device 1314 are incorporated into a touchscreen display. The architecture 1300 may additionally include a storage device 1316 (e.g., a drive unit), a signal generation device 1318 (e.g., a speaker), a network interface device 1320, and one or more sensors (not shown), such as a Global Positioning System (GPS) sensor, compass, accelerometer, or another sensor.

In some examples, the processor unit 1302 or another suitable hardware component may support a hardware interrupt. In response to a hardware interrupt, the processor unit 1302 may pause its processing and execute an ISR, for example, as described herein.

The storage device 1316 includes a non-transitory machine-readable medium 1322 on which is stored one or more sets of data structures and instructions 1324 (e.g., software) embodying or used by any one or more of the methodologies or functions described herein. The instructions 1324 can also reside, completely or at least partially, within the main memory 1304, within the static memory 1306, and/or within the processor unit 1302 during execution thereof by the architecture 1300, with the main memory 1304, the static memory 1306, and the processor unit 1302 also constituting machine-readable media.

Executable Instructions and Machine-Storage Medium

The various memories (i.e., 1304, 1306, and/or memory of the processor unit(s) 1302) and/or storage device 1316 may store one or more sets of instructions and data structures (e.g., instructions 1324) embodying or used by any one or more of the methodologies or functions described herein. These instructions, when executed by processor unit(s) 1302 cause various operations to implement the disclosed examples.

As used herein, the terms "machine-storage medium," "device-storage medium," "computer-storage medium" (referred to collectively as "machine-storage medium 1322") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1322 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1322 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1324 can further be transmitted or received over a communications network 1326 using a transmission medium via the network interface device 1320 using any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, 4G LTE/LTE-A, 5G or WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

Figure 14:
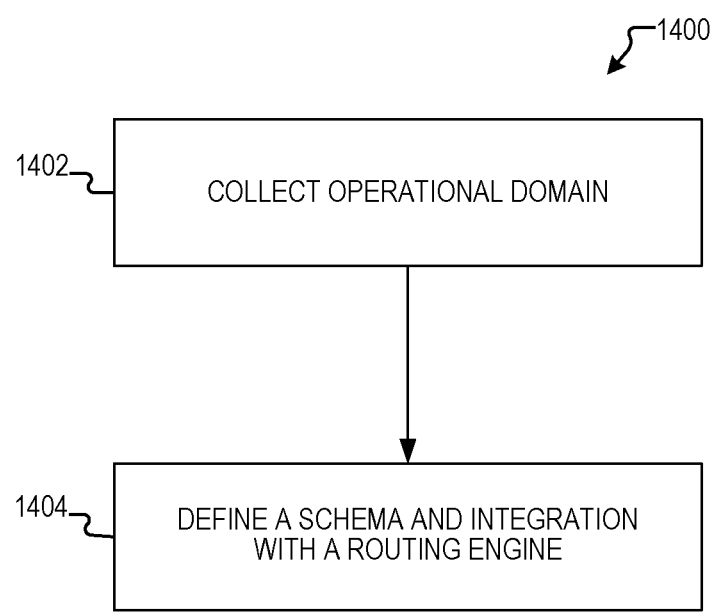
FIG. 14 is a flowchart showing one example of a process flow that can be executed by one or more of the disclosed embodiments.

FIG. 14 is a flowchart showing one example of a process flow 1400 that can be executed by one or more of the disclosed embodiments. The process flow 1400 shows just one example way that scores may be applied in the disclosed embodiments. Other application of scores generated by the route adherence scoring component 108 are contemplated. In some aspects, one or more of the functions discussed below may be performed by hardware processing circuitry. For example, instructions stored in an electronic hardware memory may configure the hardware processing circuitry to perform one or more of the functions discussed below with respect to FIG. 14.

Implementation of the route conformance scoring embodiments as described above can include sending route information to 3rd party autonomous vehicles, providing incentives for these 3rd parties to traverse one or more intermediate waypoints along a route, receiving information indicating why particular routes or waypoints may have been rejected by a 3rd party, and facilitating rerouting of autonomous vehicles operated by a 3rd party. To achieve these results, operational domain data may be collected, and schema and integration with a third-party vehicle may be defined. This will provide for communication of route information between an arranger and a third-party autonomous vehicle's autonomy system.

In operation 1402, operational domain information for a vehicle is collected. In some aspects, the operation domain data may be obtained from an OEM. For example, the OEM may provide a file including tagged data defining operational domain data for a vehicle. The operational domain information may also include a base map, such as a map available via shared streets, as available at https://github.com/sharedstreets/sharedstreets-ref-system. The operational domain information may also define operational boundaries for the vehicle. In some aspects, this may include use of a fiber optical gyroscope (FOG). The operational domain data could also include GeoJSON data, or position and weather data (e.g. PDZs). Operational domain data may also include operational regions for a vehicle based on latitude and/or longitudinal coordinates. In operation 1404, a schema and integration with a routing engine are defined.

Figure 15:
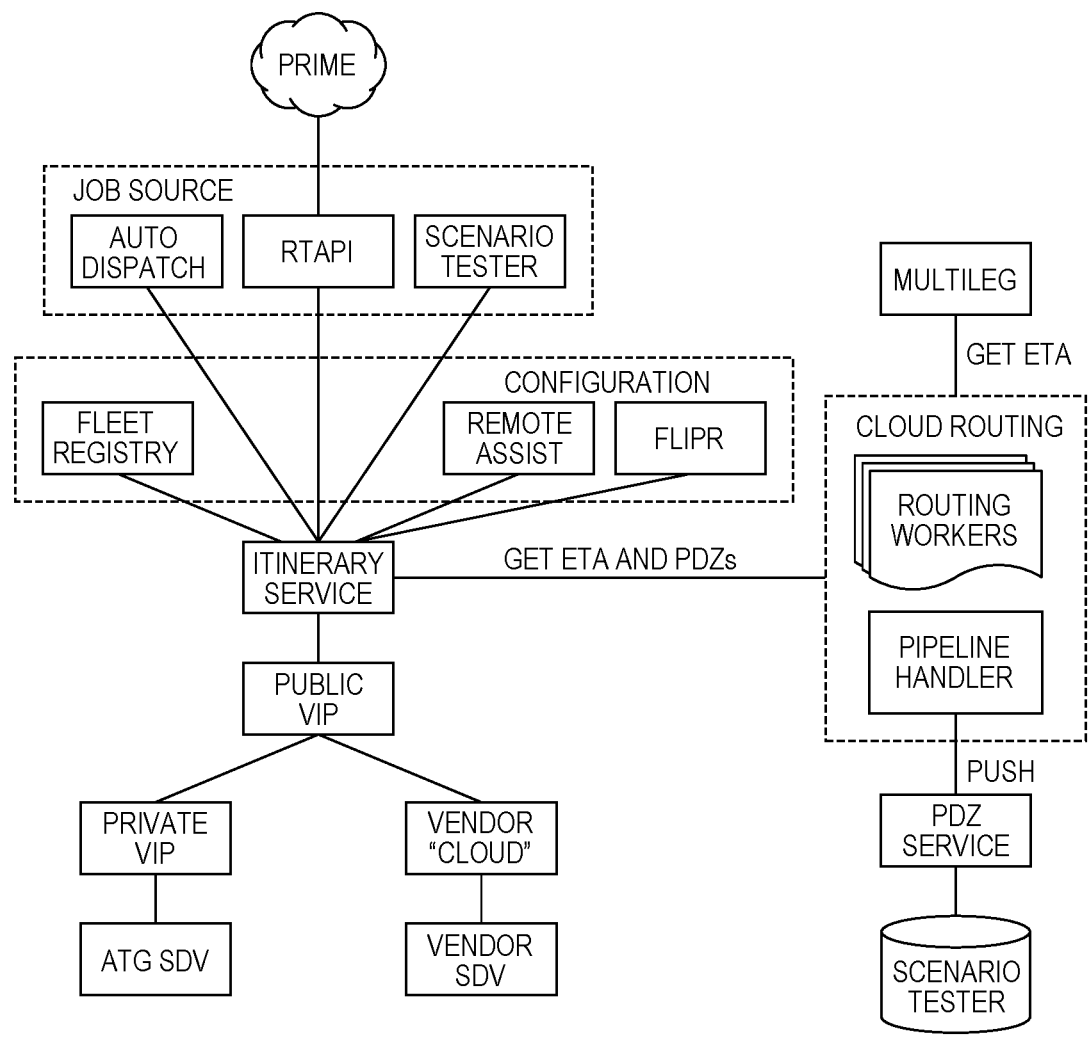
FIG. 15 is a block diagram illustrating software components implemented in one or more of the disclosed embodiments.

FIG. 15 is a block diagram illustrating software components implemented in one or more of the disclosed embodiments. To support communication between third party vehicles and the arranger 104, a model is developed to support rerouting, communication of route rejection reasons from a third-party vehicle to the arranger 104, and communication of waypoint incentives from the arranger 104 to the third-party autonomous vehicle.

Figure 16:
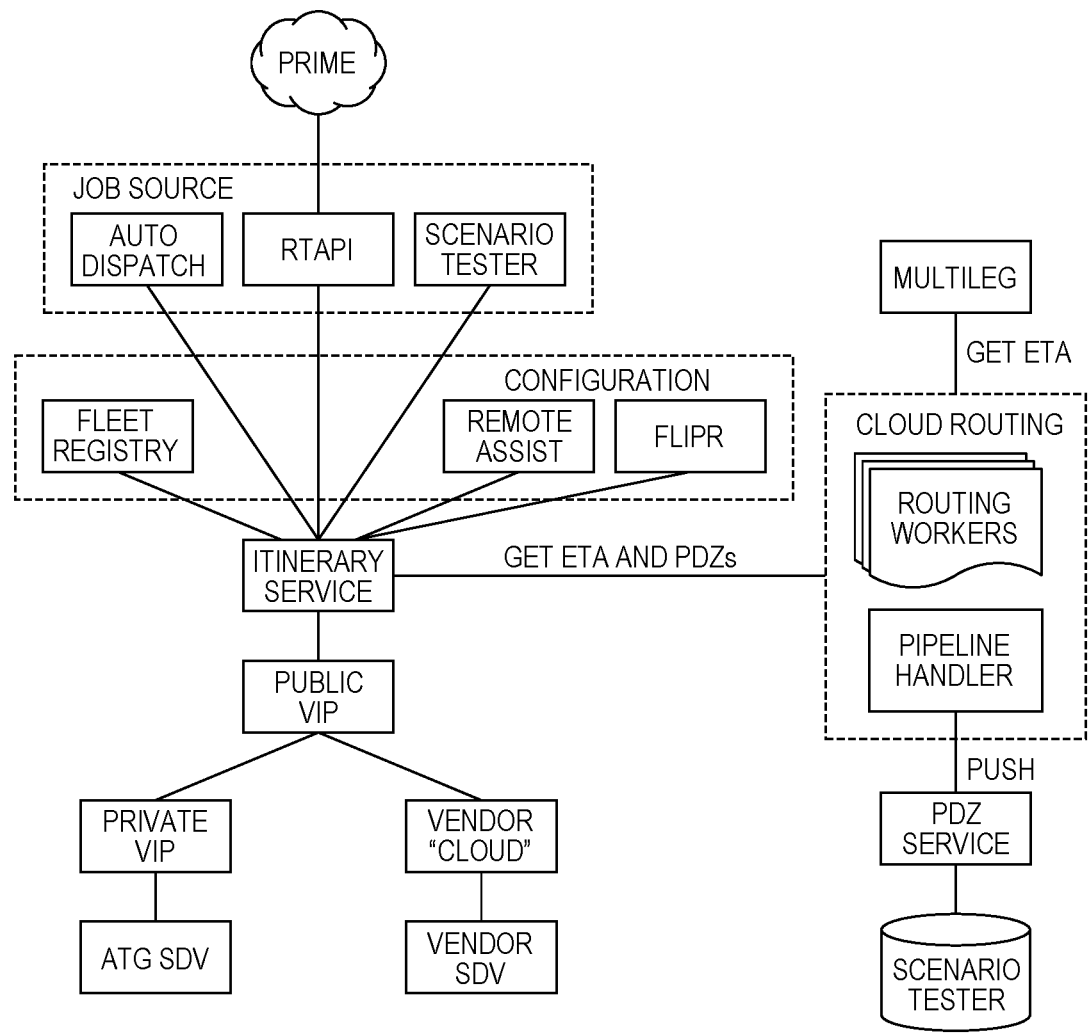
FIG. 16 shows a public VIP component sending messages to a private VIP component and/or a vendor cloud module.

In the implementation illustrated in FIG. 16, an itinerary service is shown. The itinerary service provides directions to both private and vendor cloud vehicles. The directions may be generated by the arranger 104. As shown in FIG. 16, a public VIP component sends messages to a private VIP component and/or a vendor cloud module. The messages include directions and/or route information. In some aspects, an identity service calls into a cloud routing system and annotates waypoints with reference data.

Some of the disclosed embodiments may perform rerouting operations every time an itinerary is sent by an arranger to an autonomous vehicle. Rerouting every time an itinerary is sent may provide for less complex implementations than other alternatives. Such an implementation may require some additional bandwidth relative to other implementations, but it will also provide for increased coherency between an autonomous vehicle and a dispatching system, which can provide substantial benefits.

In some other embodiments, an operator of an autonomous vehicle may generate a reroute action. This design may be more subject to abuse by operators of the autonomous vehicle than a design that reroutes each time an itinerary is sent. The arranger may also be more effected by GPS drift when relying on autonomous vehicle position information.

Some other embodiments may perform rerouting when a route changes. Such stateful implementations may require additional complexity to manage state information between an arranger and an autonomous vehicle. These embodiments have some benefits in that they consume lower amounts of network capacity.

Figure 17:
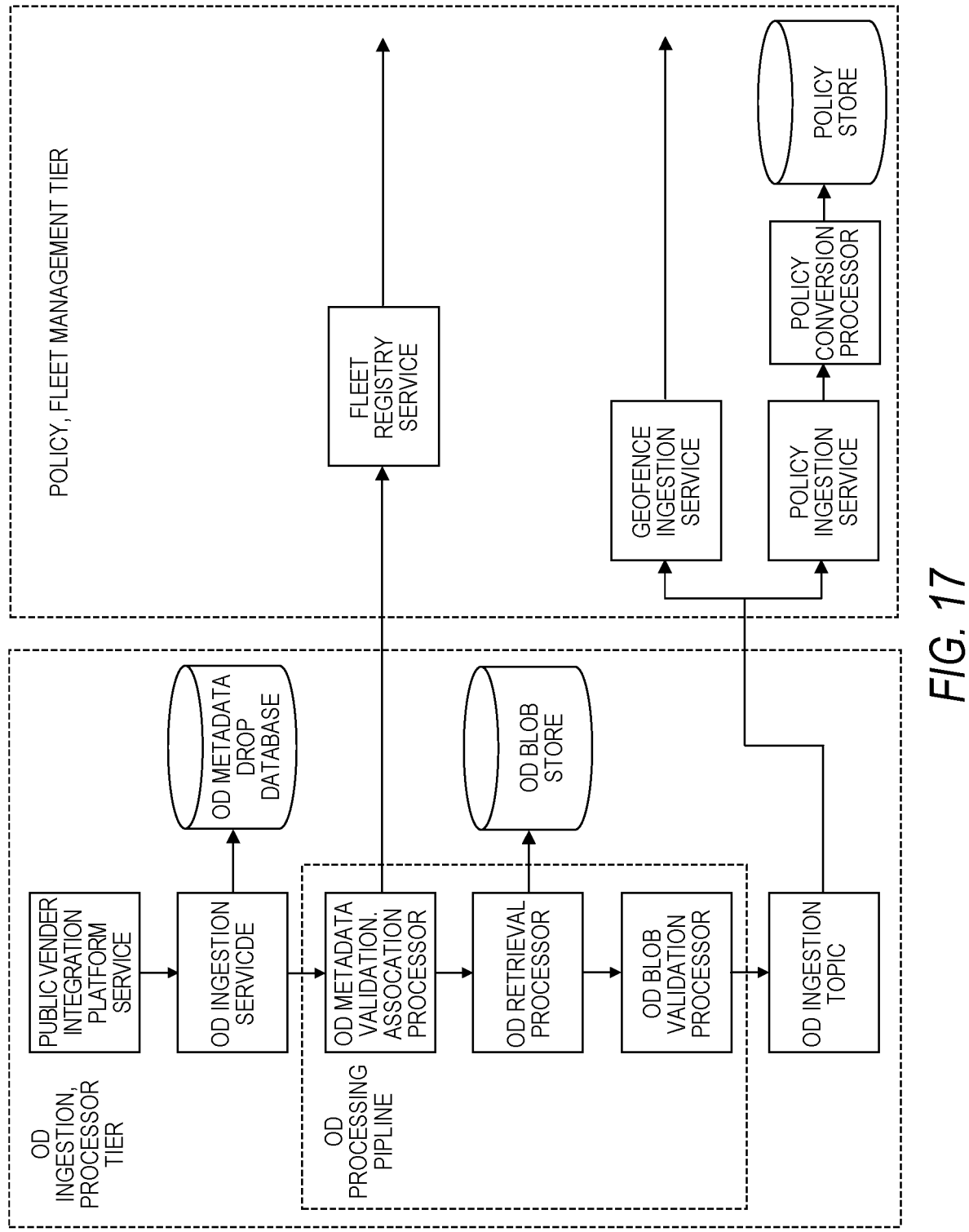
FIG. 17 illustrates an example embodiment of an operational domain ingestion processing tier and a policy fleet management tier.

FIG. 17 illustrates an example embodiment of an operational domain ingestion processing tier and a policy fleet management tier. Loss of connectivity between an arranger and an autonomous vehicle may be managed differently in various embodiments. In some embodiments, a spatial temporal grid of position reports from an autonomous vehicle is constructed. By analyzing the grid, gaps in position reports may be determined to be caused by loss of connectivity. For example, gaps in position reports may be compared to known wireless connectivity dead spots to determine whether the gaps in position reports are the result of known connectivity problems in certain areas traversed by the autonomous vehicle (e.g. urban canyons and the like). In some aspects, grids may be generated for each type of autonomous vehicle type.

In some aspects, maps indicating known areas of connectivity loss may be used to generate constraints used in routing autonomous vehicles. This may avoid having autonomous vehicles traversing areas without network connectivity, or at least reducing occurrences of these events.

Figure 18:
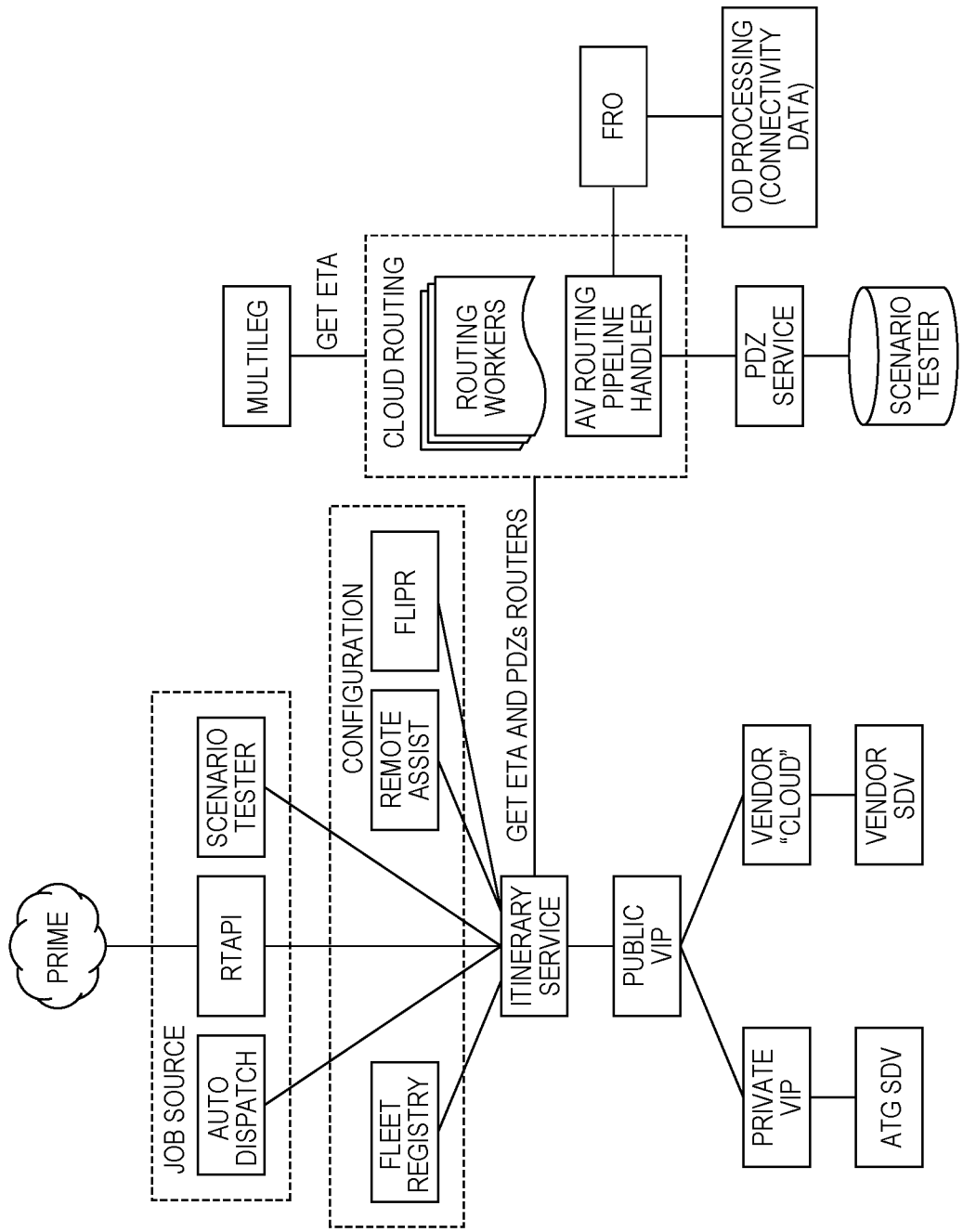
FIGS. 18-20 show alternative implementations, each of which may be implemented in one or more of the disclosed embodiments.
Figure 19:
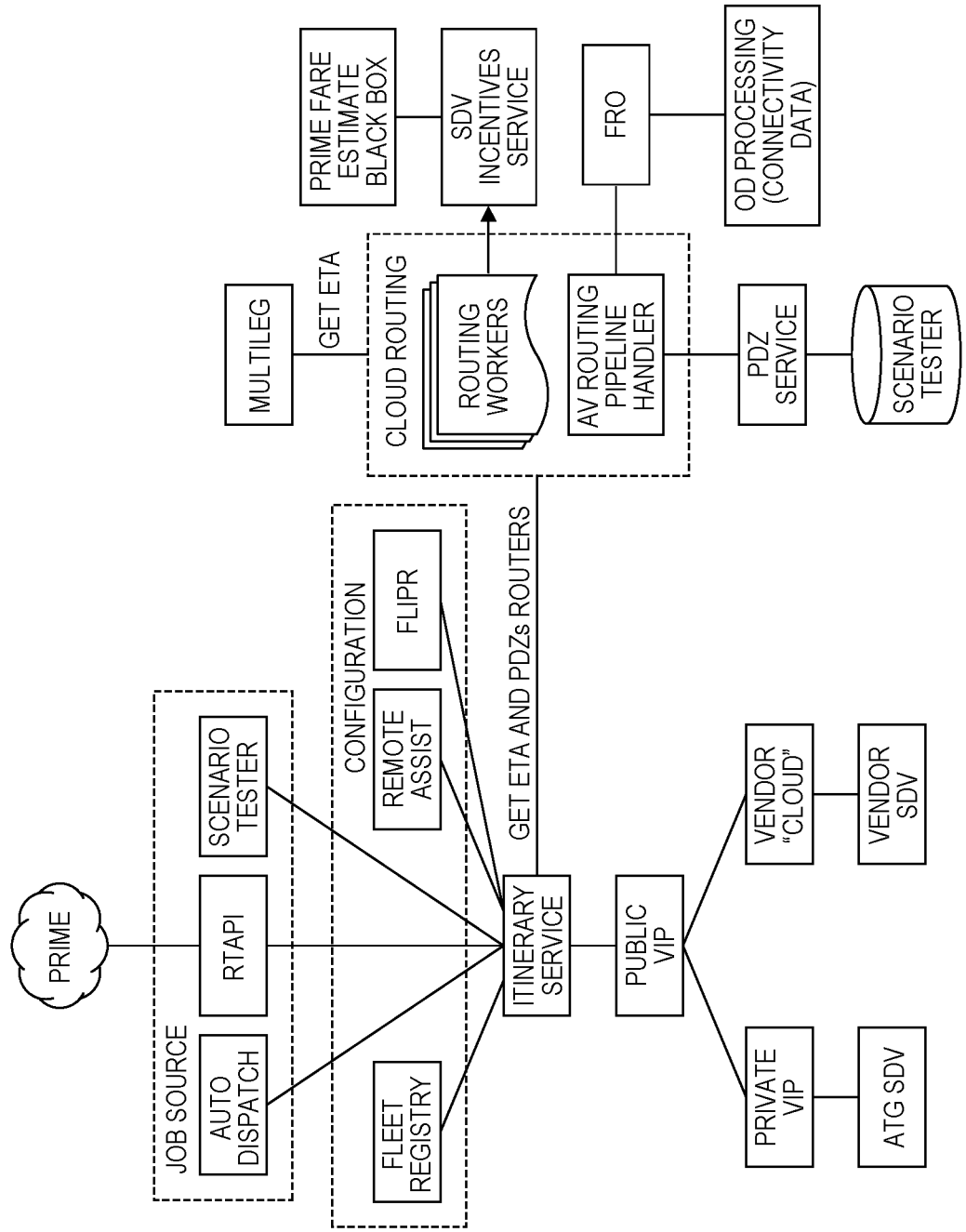
Figure 20:
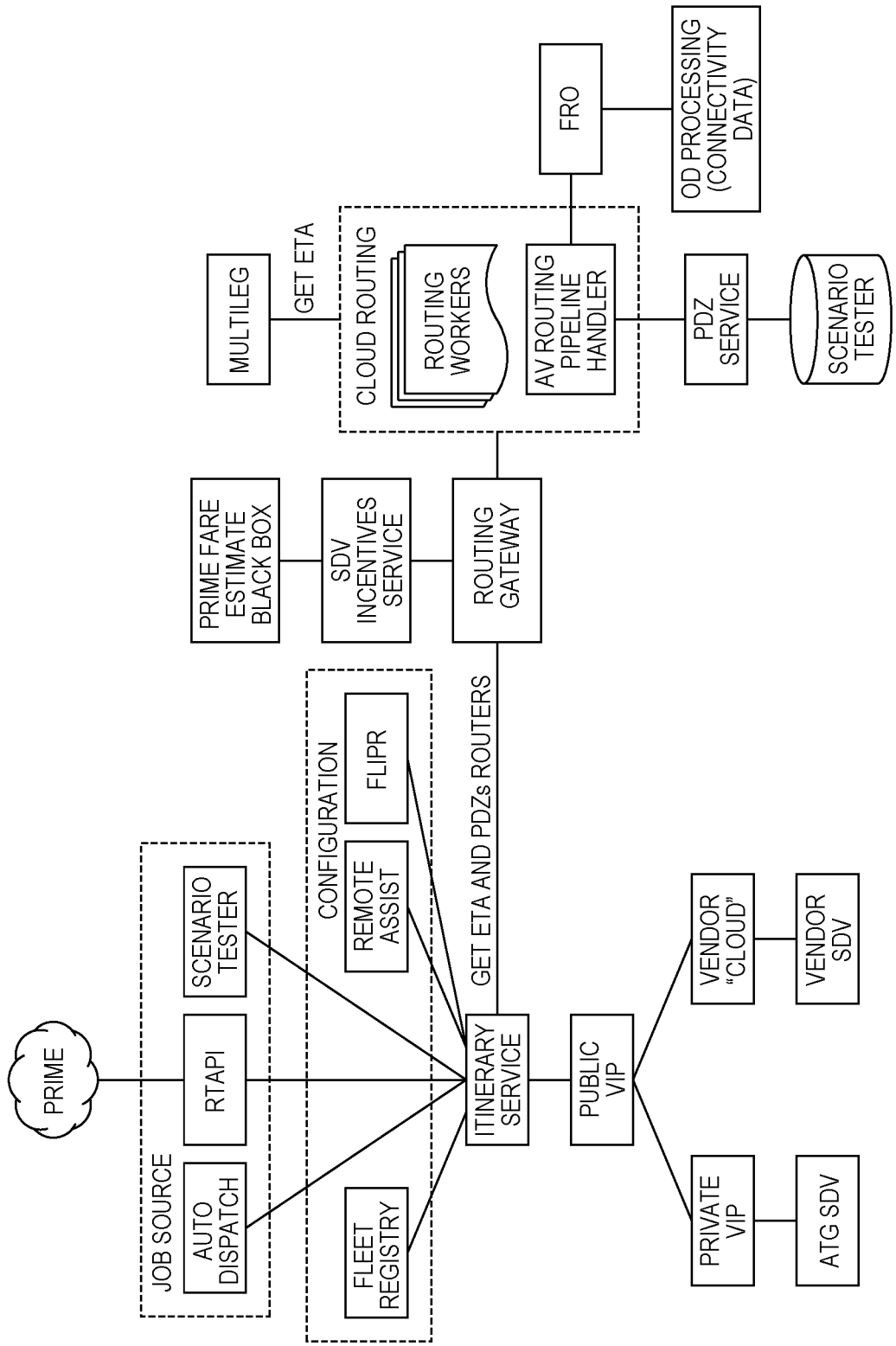

FIGS. 18-20 show alternative implementations, each of which may be implemented in one or more of the disclosed embodiments. Each of FIGS. 18-20 show different structures for including an SDV incentive service. In FIG. 18, the SDV incentive service is in communication with an itinerary service and a prime fare estimate black box. In FIG. 19, the SDV incentives service is in communication with cloud-based routing workers, and also in communication with a prime fare estimate black box. In FIG. 20, the SDV incentives service is in communication with the itinerary service via a routing gateway, and also in communication with a prime fare estimate black box.

The SDV incentive service may, in some aspects, be included within the navigator/routing engine 106. The SDV incentive service may determine a weight for each waypoint within a route generated by the navigator/routing engine 106. The SDV incentive service may determine a particular weight strategy for a particular autonomous vehicle type based on a mapping from the autonomous vehicle type to the strategy. In some aspects, these mappings may be contractually determined.

When assigning weights to a route, the SDV incentive service may first determine a type of autonomous vehicle that will execute the route. The type of autonomous vehicle may relate to, for example, a manufacturer of the autonomous vehicle, an operator/owner of the autonomous vehicle, or in some aspects, a combination of these factors. The mapping may indicate whether, for example, how many and what types of portions are included in fares paid to the autonomous vehicle. For example, some autonomous vehicle types may be paid a fare including only one portion, which may be paid in its entirety when a vehicle completes a transportation service from an origin location to a destination location of a route (e.g. only a base fare as described above with respect to FIG. 7). Other autonomous vehicles may be paid fares having two portions, a first, fixed or base portion is paid upon completion of the route, with a second portion of the fare (e.g. an incentive portion) based on how many or what percentage of waypoints were traversed while completing the route, as discussed in more detail above. Some autonomous vehicles may include only one fare portion, which is entirely based on how many or what percentage of waypoints were traversed during completion of a route.

Example 1 is a method, comprising: generating a route for a vehicle, the route including a plurality of waypoints between origin and destination for the route; assigning a corresponding weight to each of the waypoints; request a vehicle to execute the route; monitoring a position of the vehicle during the execution of the route; determining a number of waypoints traversed by the vehicle during the execution of the route based on the monitoring; determining a score for the vehicle's execution of the route based on the number of waypoints and the corresponding weights; and applying the score to operation of the vehicle.

In Example 2, the subject matter of Example 1 optionally includes wherein the vehicle is an autonomous vehicle.

In Example 3, the subject matter of any one or more of Examples 1-2 optionally include receiving a deviation reason from the vehicle, wherein the score of the vehicle's execution of the route is further based on the deviation reason.

In Example 4, the subject matter of Example 3 optionally includes wherein the deviation reason indicates the vehicle deviated from the route due to one of an accident, a road closure, or a request from a rider.

In Example 5, the subject matter of any one or more of Examples 1-4 optionally include wherein applying the score comprises: determining aggregated scores for each type of vehicle of a plurality of vehicle types; receiving a plurality of service requests; and allocating the plurality of service requests to each type of vehicle based on the aggregated scores.

In Example 6, the subject matter of any one or more of Examples 3-5 optionally include wherein the plurality of service requests are allocated to each vehicle type in proportion to the corresponding aggregated score.

In Example 7, the subject matter of any one or more of Examples 1-6 optionally include determining a fare for the route; determining a first portion of the fare and a second portion of the fare; adjusting the second portion of the fare based on the number of waypoints traversed; and providing the fare to an operator of the vehicle.

In Example 8, the subject matter of Example 7 optionally includes wherein the second portion is further adjusted based on the weights of the waypoints.

In Example 9, the subject matter of any one or more of Examples 1-8 optionally include terminating the execution of the route in response to the position of the vehicle deviating from the route more than a threshold distance.

Example 10 is a system, comprising: hardware processing circuitry; one or more hardware memories comprising instructions that when executed configure the hardware processing circuitry to perform operations comprising: generating a route for a vehicle, the route including a plurality of waypoints between an origin and destination for the route; assigning a corresponding weight to each of the waypoints; requesting a vehicle to execute the route; monitor a position of the vehicle during the execution of the route; determining a number of waypoints traversed by the vehicle during the execution of the route based on the monitoring; determining a score for the vehicle's execution of the route based on the number of waypoints and the corresponding weights; and applying the score to operation of the vehicle.

In Example 11, the subject matter of Example 10 optionally includes wherein the vehicle is an autonomous vehicle.

In Example 12, the subject matter of any one or more of Examples 10-11 optionally include the operations further comprising receiving a deviation reason from the vehicle, wherein the score of the vehicle's execution of the route is further based on the deviation reason.

In Example 13, the subject matter of Example 12 optionally includes wherein the deviation reason indicates the vehicle deviated from the route due to one of an accident, a road closure, or a request from a rider.

In Example 14, the subject matter of any one or more of Examples 10-13 optionally include wherein applying the score comprises: determining aggregated scores for each type of vehicle of a plurality of vehicle types; receiving a plurality of service requests; and allocating the plurality of service requests to each type of vehicle based on the aggregated scores.

In Example 15, the subject matter of any one or more of Examples 12-14 optionally include wherein the plurality of service requests are allocated to each vehicle type in proportion to the corresponding aggregated score.

In Example 16, the subject matter of any one or more of Examples 10-15 optionally include the operations further comprising: determining a fare for the route; determining a first portion of the fare and a second portion of the fare; adjusting the second portion of the fare based on the number of waypoints traversed; and providing the fare to an operator of the vehicle.

In Example 17, the subject matter of Example 16 optionally includes wherein the second portion is further adjusted based on the weights of the waypoints.

In Example 18, the subject matter of any one or more of Examples 10-17 optionally include the operations further comprising terminating the execution of the route in response to the position of the vehicle deviating from the route more than a threshold distance.

Example 19 is a non-transitory computer readable storage medium comprising instructions that when executed configure hardware processing circuitry to perform operations comprising: generating a route for a vehicle, the route including a plurality of waypoints between origin and destination for the route; assigning a corresponding weight to each of the waypoints; requesting a vehicle to execute the route; monitoring a position of the vehicle during the execution of the route; determining a number of waypoints traversed by the vehicle during the execution of the route based on the monitoring; determining a score for the vehicle's execution of the route based on the number of waypoints and the corresponding weights; and applying the score to operation of the vehicle.

In Example 20, the subject matter of Example 19 optionally includes wherein the vehicle is an autonomous vehicle.

In Example 21, the subject matter of any one or more of Examples 19-20 optionally include the operations further comprising receiving a deviation reason from the vehicle, wherein the score of the vehicle's execution of the route is further based on the deviation reason.

In Example 22, the subject matter of Example 21 optionally includes wherein the deviation reason indicates the vehicle deviated from the route due to one of an accident, a road closure, or a request from a rider.

In Example 23, the subject matter of any one or more of Examples 19-22 optionally include wherein applying the score comprises: determining aggregated scores for each type of vehicle of a plurality of vehicle types; receiving a plurality of service requests; and allocating the plurality of service requests to each type of vehicle based on the aggregated scores.

In Example 24, the subject matter of Example 23 optionally includes wherein the plurality of service requests are allocated to each vehicle type in proportion to the corresponding aggregated score.

In Example 25, the subject matter of any one or more of Examples 19-24 optionally include the operations further comprising: determining a fare for the route; determining a first portion of the fare and a second portion of the fare; adjusting the second portion of the fare based on the number of waypoints traversed; and providing the fare to an operator of the vehicle.

In Example 26, the subject matter of Example 25 optionally includes wherein the second portion is further adjusted based on the weights of the waypoints.

In Example 27, the subject matter of any one or more of Examples 19-26 optionally include the operations further comprising terminating the execution of the route in response to the position of the vehicle deviating from the route more than a threshold distance.

The invention claimed is:

1. A method, comprising:
generating a route for a vehicle, the route including a plurality of waypoints between origin and destination for the route;
storing routing information associated with the route, the routing information comprising identification of each of the plurality of waypoints and a total quantity of waypoints included in the plurality of waypoints of the route;
assigning a corresponding weight to each of the waypoints;
transmitting a request to the vehicle to execute the route;
in response to transmitting the request, autonomously utilizing one or more sensors of the vehicle to autonomously navigate the vehicle along the plurality of waypoints of the route;
monitoring a position of the vehicle while the vehicle executes the route;
generating a log file that identifies a subset of the plurality of waypoints that have been traversed by the vehicle while the vehicle executes the route;
after the vehicle completes executing the route, computing, based on the subset of the plurality of waypoints that have been traversed identified in the generated the log file, a number of waypoints that are in the subset of the plurality of waypoints that have been traversed by the vehicle;
determining a value representing the computed number of waypoints that are in the subset of the plurality of waypoints that have been traversed by the vehicle relative to the total quantity of waypoints included in the plurality of waypoints of the route;
determining a score associated with the route executed by the vehicle based on the determined value and the weight of the waypoints in the subset of the plurality of waypoints that have been traversed by the vehicle; and
applying the score to operation of the vehicle.

2. The method of claim 1, further comprising:
determining that the vehicle has deviated from the route based on the log file; and
receiving data indicating a reason for the vehicle deviating from the route, wherein the is further based on the reason indicated by the data.

3. The method of claim 1, wherein applying the score comprises:
determining an aggregated score for each of a plurality of vehicles comprising the vehicle;
receiving a plurality of service requests; and
allocating the plurality of service requests to the plurality of vehicles in accordance with the aggregated score of each of the plurality of vehicles.

4. The method of claim 1, further comprising:
determining a fare for the route;
determining a first portion of the fare and a second portion of the fare;
adjusting the second portion of the fare based on the computed number; and
providing the fare to an operator of the vehicle.

5. The method of claim 4, wherein the second portion is further adjusted based on the weight of the waypoints in the subset of the plurality of waypoints.

6. A system, comprising:
hardware processing circuitry; and one or more hardware memories comprising instructions that when executed configure the hardware processing circuitry to perform operations comprising:
  generating a route for a vehicle, the route including a plurality of waypoints between an origin and destination for the route;
  storing routing information associated with the route, the routing information comprising identification of each of the plurality of waypoints and a total quantity of waypoints included in the plurality of waypoints of the route;
  assigning a corresponding weight to each of the waypoints;
  transmitting a request to the vehicle to execute the route;
  in response to transmitting the request, autonomously utilizing one or more sensors of the vehicle to autonomously navigate the vehicle along the plurality of waypoints of the route;
  monitoring a position of the vehicle while the vehicle executes the route;
  generating a log file that identifies a subset of the plurality of waypoints that have been traversed by the vehicle while the vehicle executes the route;
  after the vehicle completes executing the route, computing, based on the subset of the plurality of waypoints have been traversed, identified in the generated the log file, a number of waypoints that are in the subset of the plurality of waypoints;
  determining a value representing the computed number of waypoints that are in the subset of the plurality of waypoints that have been traversed by the vehicle relative to the total quantity of waypoints included in the plurality of waypoints of the route;
  determining a score associated with the route executed by the vehicle based on the determined value and the weight of the waypoints in the subset of the plurality of waypoints that have been traversed by the vehicle; and
  applying the score to operation of the vehicle.

7. The system of claim 6; the operations further comprising:
  determining that the vehicle has deviated from the route based on the log file; and
  receiving data indicating a reason for the vehicle deviating from the route.

8. The system of claim 7, wherein the score is further based on the reason indicated by the data.

9. The system of claim 7, wherein the reason indicates the vehicle deviated from the route due to one of an accident, a road closure, or a rider request.

10. The system of claim 6, wherein applying the score comprises:
  determining an aggregated score for each of a plurality of vehicles comprising the vehicle;
  receiving a plurality of service requests; and
  allocating the plurality of service requests to the plurality of vehicles in accordance with the aggregated score of each of the plurality of vehicles.

11. The system of claim 6, the operations further comprising:
  determining a fare for the route;
  determining a first portion of the fare and a second portion of the fare;
  adjusting the second portion of the fare based on the computed number; and
  providing the fare to an operator of the vehicle.

12. The system of claim 11, wherein the second portion is further adjusted based on the weight of the waypoints in the subset of the plurality of waypoints.

13. The system of claim 6, the operations further comprising:
  determining, while the vehicle executes the route, that the position of the vehicle deviates from the route by more than a threshold distance; and
  terminating execution of the route by the vehicle in response determining, while the vehicle executes the route, that the position of deviates from the route by more than the threshold distance.

14. A non-transitory computer readable storage medium comprising instructions that when executed configure hardware processing circuitry to perform operations comprising:
  generating a route for a vehicle, the route including a plurality of waypoints between origin and destination for the route;
  storing routing information associated with the route, the routing information comprising identification of each of the plurality of waypoints and a total quantity of waypoints included in the plurality of waypoints of the route;
  assigning a corresponding weight to each of the waypoints;
  transmitting a request to the vehicle to execute the route;
  in response to transmitting the request, autonomously utilizing one or more sensors of the vehicle to autonomously navigate the vehicle along the plurality of waypoints of the route;
  monitoring a position of the vehicle while the vehicle executes the route;
  generating a log file that identifies a subset of the plurality of waypoints that have been traversed by the vehicle while the vehicle executes the route;
  after the vehicle completes executing the route, computing, based on the subset of the plurality of waypoints have been traversed identified in the generated log file, a number of waypoints that are in the subset of the plurality of waypoints;
  determining a value representing the computed number of waypoints that are in the subset of the plurality of waypoints that have been traversed by the vehicle relative to the total quantity of waypoints included in the plurality of waypoints of the route;
  determining a score associated with the route executed by the vehicle based on the determined value and the weight of the waypoints in the subset of the plurality of waypoints that have been traversed by the vehicle; and
  applying the score to operation of the vehicle.

15. The non-transitory computer readable storage medium of claim 14, the operations further comprising:
  determining that the vehicle has deviated from the route based on the log file; and
  receiving data indicating a reason for the vehicle deviating from the route, wherein the score is further based on the reason indicated by the data.

16. The non-transitory computer readable storage medium of claim 14, wherein applying the score comprises:
  determining an aggregated score for each of a plurality of vehicles comprising the vehicle;
  receiving a plurality of service requests; and
  allocating the plurality of service requests to the plurality of vehicles in accordance with the aggregated score of each of the plurality of vehicles.

17. The non-transitory computer readable storage medium of claim 14, the operations further comprising:

determining a fare for the route;
determining a first portion of the fare and a second portion of the fare;
adjusting the second portion of the fare based on the computed number of the plurality of waypoints traversed and the corresponding weight of each of the plurality of waypoints; and
providing the fare to an operator of the vehicle.

* * * * *

UNITED STATES PATENT AND TRADEMARK OFFICE
CERTIFICATE OF CORRECTION

PATENT NO. : 11,619,502 B2
APPLICATION NO. : 16/827170
DATED : April 4, 2023
INVENTOR(S) : Michael Voznesensky It is certified that error appears in the above-identified patent and that said Letters Patent is hereby corrected as shown below:

In the Claims

In Column 34, Line 46, in Claim 2, after "wherein the", insert --score--

In Column 35, Line 41, in Claim 7, delete "claim 6;" and insert --claim 6,-- therefor Signed and Sealed this
Twenty-third Day of May, 2023

Katherine Kelly Vidal
*Director of the United States Patent and Trademark Office*